United States Patent
Potyrailo et al.

(10) Patent No.: US 11,674,918 B2
(45) Date of Patent: Jun. 13, 2023

(54) MONOLITHIC GAS-SENSING CHIP ASSEMBLY AND METHOD

(71) Applicant: GENERAL ELECTRIC COMPANY, Schenectady, NY (US)

(72) Inventors: Radislav Alexandrovich Potyrailo, Niskayuna, NY (US); Emad Andarawis Andarawis, Ballston Lake, NY (US); Naresh Kesavan Rao, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 17/715,693

(22) Filed: Apr. 7, 2022

(65) Prior Publication Data
US 2022/0229005 A1   Jul. 21, 2022

Related U.S. Application Data

(63) Continuation of application No. 16/562,611, filed on Sep. 6, 2019, now Pat. No. 11,300,534.

(51) Int. Cl.
*G01N 27/12* (2006.01)
*G01N 27/22* (2006.01)

(52) U.S. Cl.
CPC ......... *G01N 27/123* (2013.01); *G01N 27/226* (2013.01); *G01N 27/228* (2013.01)

(58) Field of Classification Search
CPC ... G01N 27/226; G01N 27/228; G01N 27/026
See application file for complete search history.

(56) References Cited

U.S. PATENT DOCUMENTS

| 5,659,127 A | 8/1997 | Shie |
|---|---|---|
| 5,866,800 A | 2/1999 | Park |

(Continued)

FOREIGN PATENT DOCUMENTS

EP   2952886 B1   12/2015

OTHER PUBLICATIONS

Fitch, J. Patrick, et al.; "Technology Challenges in Responding to Biological or Chemical Attacks in the Civilian Sector", Science 2003, vol. 302, pp. 1350-1354.

(Continued)

*Primary Examiner* — Alvaro E Fortich
(74) *Attorney, Agent, or Firm* — Fletcher Yoder, P.C.

(57) ABSTRACT

A monolithic gas-sensing chip assembly for sensing a gas analyte includes a sensing material to detect the gas analyte, a sensing system including a resistor-capacitor electrical circuit, and a heating element. A sensing circuit measures an electrical response of the sensing system to an alternating electrical current applied to the sensing system at (a) one or more different frequencies, or (b) one or more different resistor-capacitor configurations of the system. One or more processors control a low detection range of the system to the gas, a high detection range of the system to the gas, a linearity of a response of the system to the gas, a dynamic range of measurements of the gas by the system, a rejection of interfering gas analytes by the system, a correction for aging or poisoning of the system, or a rejection of ambient interferences that may affect the electrical response of the system.

20 Claims, 9 Drawing Sheets

(56) References Cited

U.S. PATENT DOCUMENTS

| | | | |
|---|---|---|---|
| 6,111,280 | A | 8/2000 | Gardner |
| 8,072,009 | B2 | 12/2011 | Krauss |
| 8,519,726 | B2 | 8/2013 | Sun |
| 8,547,110 | B2 | 10/2013 | Kesil |
| 9,046,482 | B2 | 6/2015 | Kamata |
| 9,105,479 | B2 | 8/2015 | Besling |
| 9,228,973 | B2 | 1/2016 | Usagawa |
| 9,261,474 | B2 | 2/2016 | Potyrailo |
| 9,389,260 | B2 | 7/2016 | Potyrailo |
| 9,465,004 | B2 | 10/2016 | Fix |
| 9,638,653 | B2 | 5/2017 | Potyrailo |
| 9,678,030 | B2 | 6/2017 | Potyrailo |
| 9,816,954 | B2 | 11/2017 | Santangelo |
| 9,863,901 | B2 | 1/2018 | Feyh |
| 9,952,171 | B2 | 4/2018 | Hunziker |
| 9,964,514 | B2 | 5/2018 | Widenmeyer |
| 9,995,593 | B2 | 6/2018 | Badeja |
| 10,060,872 | B1 * | 8/2018 | Potyrailo ............ F02D 19/029 |
| 10,184,910 | B2 | 1/2019 | Lammel |
| 10,317,357 | B2 | 6/2019 | LeNeel |
| 10,368,146 | B2 | 7/2019 | Potyrailo |
| 11,300,534 | B2 * | 4/2022 | Potyrailo ............ G01N 27/123 |
| 2004/0075140 | A1 | 4/2004 | Baltes |
| 2006/0154401 | A1 | 7/2006 | Gardner |
| 2011/0068807 | A1 * | 3/2011 | Kesil ................ G01N 27/023 |
| | | | 324/633 |
| 2014/0134053 | A1 | 5/2014 | Mayer |
| 2014/0212979 | A1 | 7/2014 | Burgi |
| 2014/0216129 | A1 | 8/2014 | Schmidlin |
| 2016/0187277 | A1 * | 6/2016 | Potyrailo ........... G01N 33/2888 |
| | | | 324/633 |
| 2017/0138876 | A1 | 5/2017 | Potyrailo |
| 2017/0176330 | A1 | 6/2017 | Lahti |
| 2017/0261454 | A1 | 9/2017 | Ho |
| 2018/0008089 | A1 | 1/2018 | Jiang |
| 2018/0059091 | A1 | 3/2018 | Schibli |
| 2018/0080890 | A1 | 3/2018 | Potyrailo |
| 2018/0080891 | A1 * | 3/2018 | Potyrailo .............. G01N 27/04 |
| 2018/0194617 | A1 | 7/2018 | Krauss |
| 2019/0195822 | A1 * | 6/2019 | De Bruyker ......... G01N 27/26 |
| 2019/0257803 | A1 | 8/2019 | Brown |

OTHER PUBLICATIONS

Turner, Anthony P.F., et al.; "Electronic Noses and Disease Diagnostics", Innovation; Nature Reviews|Microbiology; Feb. 2004, vol. 2, pp. 101-106.

Snow, E. S., et al.; "Chemical Detection with a Single-Walled Carbon Nanotube Capacitor", Science 307, 2005, pp. 1942-1945.

Cooks, R. Graham, et al.; "Ambient Mass Spectrometry", Science 2006, vol. 311, pp. 1566-1570.

Janasek, Dirk, et al.; "Scaling and the design of miniaturized chemical-analysis systems", Nature 2006, vol. 442, pp. 374-380.

Schedin, F., et al.; "Detection of individual gas molecules adsorbed on graphene", Nat. Mater. 2007, vol. 6, pp. 652-655.

Potyrailo, Radislav. A., et al.; "Materials and Transducers Toward Selective Wireless Gas Sensing", Chem. Rev. 2011, 111, pp. 7315-7354.

Allen, David T., et al.; "Measurements of methane emissions at natural gas production sites in the United States", Proc. Natl. Acad. Sci. U.S.A. 2013, 110, pp. 17768-17773.

Fadel, Tarek R., et al.; "Toward the Responsible Development and Commercialization of Sensor Nanotechnologies", ACS Sens. 2016, 1, pp. 207-216.

Lewis, Alastair, et al., "Validate personal air-pollution sensors", Nature 2016, vol. 535, pp. 29-31.

Potyrailo, Radislav. A.; "Multivariable sensors for ubiquitous monitoring of gases in the era of Internet of Things and Industrial Internet", Chem. Rev. 2016, 116, pp. 11877-11923.

Schipani F., et al.; "Electrical Characterization of Semiconductor Oxide-Based Gas Sensors Using Impedance Spectroscopy: A Review", Rev. Adv. Sci. Eng. 2017, vol. 5, pp. 86-105.

Fahad, Hossain Mohammad, et al.; "Room temperature multiplexed gas sensing using chemical-sensitive 3.5-nm-thin silicon transistors", Sci. Adv. 2017, vol. 3, e1602557, pp. 1-8.

Kalantar-Zadeh, Kourosh, et al.; "A human pilot trial of ingestible electronic capsules capable of sensing different gases in the gut", Nat. Electron. 2018, vol. 1, pp. 79-87.

* cited by examiner

MONOLITHIC GAS-SENSING CHIP ASSEMBLY AND METHOD

CROSS-REFERENCE TO RELATED APPLICATION

This application is a continuation of U.S. patent application Ser. No. 16/562,611, entitled "MONOLITHIC GAS-SENSING CHIP ASSEMBLY AND METHOD", filed Sep. 6, 2019, which is herein incorporated by reference in its entirety.

GOVERNMENT LICENSE RIGHTS

This invention was made with government support under contract 75D30118CO2617 awarded by the National Institute For Occupational Safety And Health. The government has certain rights in the invention.

FIELD

One or more embodiments are disclosed that relate to monolithic gas-sensing chip assemblies and methods for sensing gases.

BACKGROUND

Detection of particular gases in complex environments with needed selectivity and accuracy is needed in diverse applications ranging from environmental surveillance, to industrial safety, process monitoring, medical diagnostics, homeland protection, and many others. Gas sensors provide continuous monitoring capabilities, but the reduced selectivity of conventional gas sensors limits their adoption into new applications for wearable and distributed sensing. Such limitations originate from their design of having a single output per sensor.

Thus, when detection selectivity and accuracy are needed, instruments based on traditional analytical technologies such as gas chromatography, mass spectrometry, ion mobility spectrometry, and tunable diode laser absorption spectroscopy are preferred despite their limitations of relatively high power consumption, narrow dynamic range, cost, and size. These instruments are often inconvenient and costly, even with the reduced carrier gas, vacuum, or power demands, but currently is an unavoidable alternative to existing sensors.

BRIEF DESCRIPTION

In one or more embodiments, a monolithic gas-sensing chip assembly for sensing at least one gas analyte includes a sensing material configured to detect the at least one gas analyte, a sensing system that includes a resistor-capacitor electrical circuit in contact with the sensing material, and a heating element configured to control a temperature of the sensing material of the sensing system. A sensing circuit is configured to measure an electrical response of the sensing system to an alternating electrical current applied to the sensing system at one or more of: (a) one or more different frequencies, or (b) one or more different resistor-capacitor configurations of the sensing system. One or more processors may control one or more of a low detection range of the sensing system to the at least one gas analyte, a high detection range of the sensing system to the at least one gas analyte, a linearity of a response of the sensing system to the at least one gas analyte, a dynamic range of measurements of the at least one gas analyte by the sensing system, a rejection of one or more interfering gas analytes by the sensing system, a correction for aging or poisoning of the sensing system, or a rejection of ambient interferences that may affect the electrical response of the sensing system to the alternating electrical current applied to the sensing system that may be measured by the sensing circuit.

In another embodiment, a method for forming a monolithic gas-sensing chip assembly for sensing at least one gas analyte includes coupling a sensing material with a sensing system. The sensing material may detect the at least one gas analyte. The sensing system includes a resistor-capacitor electrical circuit in contact with the sensing material. A heating element is coupled with the sensing material to control a temperature of the sensing material. A sensing circuit is coupled with the sensing material. The sensing circuit is configured to measure one or more electrical responses of the sensing system to an alternating electrical current applied to the sensing system at one or more of: one or more different frequencies, or one or more different resistor-capacitor configurations of the sensing system. One or more processors are coupled with the sensing circuit. The one or more processors are configured to control one or more of a low detection range of the sensing system to the at least one gas analyte, a high detection range of the sensing system to the at least one gas analyte, a linearity of a response of the sensing system to the at least one gas analyte, a dynamic range of measurements of the at least one gas analyte by the sensing system, a rejection of one or more interfering gas analytes by the sensing system, a correction for aging or poisoning of the sensing system, or a rejection of ambient interferences to the impedances that are measured by the sensing circuit.

In another embodiment, a gas sensing assembly includes a sensing material configured to detect a gas, and a sensing system that includes a resistor-capacitor electrical circuit in contact with the sensing material. The resistor-capacitor electrical circuit is configured to change one or more of a resistance or a capacitance of the resistor-capacitor electrical circuit. A heating element is configured to control a temperature of the sensing material of the sensing system, and a sensing circuit is configured to measure one or more electrical responses to an alternating electrical current that is configured to be applied to the sensing system at one or more of different frequencies, different resistances of the resistor-capacitor electrical circuit, or different capacitances of the resistor-capacitor electrical circuit. The gas sensing assembly includes an exterior housing in which the sensing material, the sensing system, the heating element, and the sensing circuit are disposed in a stacked arrangement.

DETAILED DESCRIPTION

Figure 1:
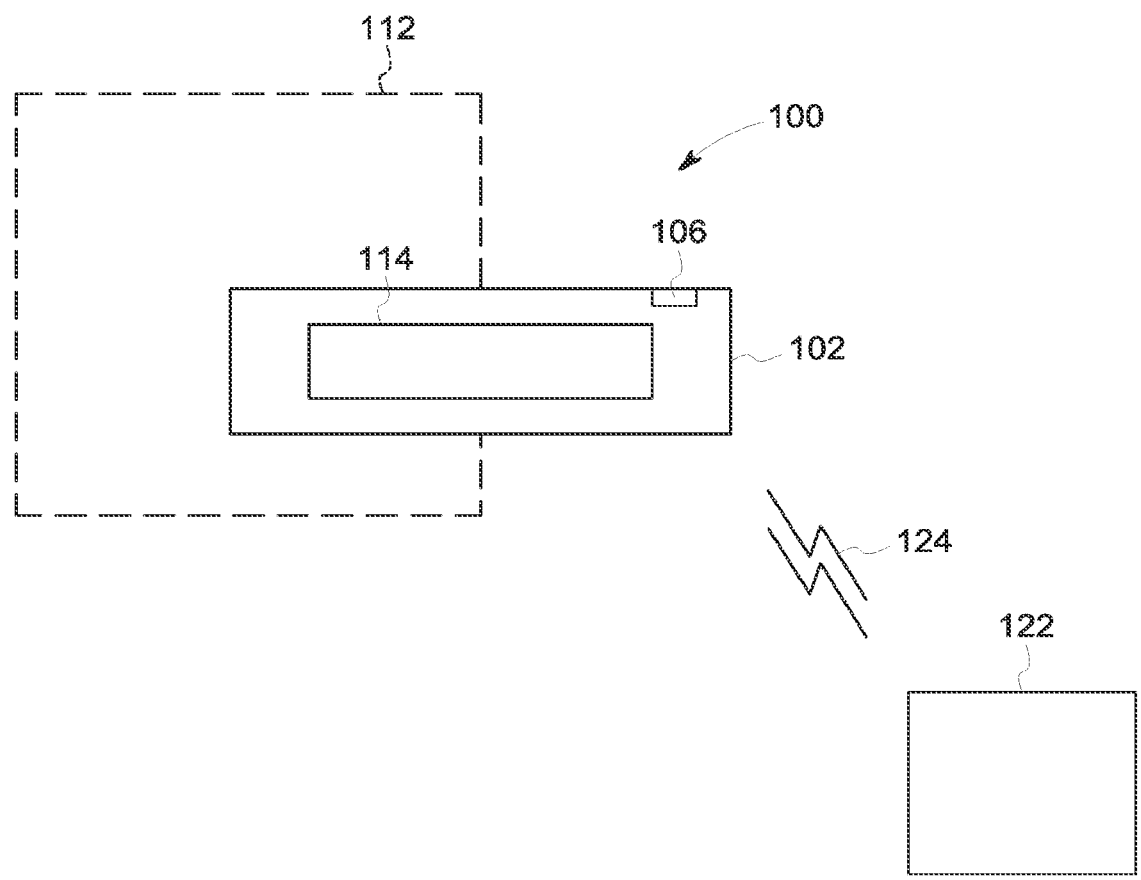
FIG. 1 illustrates a monolithic gas-sensing chip assembly in accordance with one embodiment.

One or more embodiments of the inventive subject matter described herein provide systems and methods that provide a monolithic gas-sensing chip assembly for sensing at least one gas analyte. The systems and methods couple a sensing material used to detect the gas analyte with a sensing element including a resistor-capacitor circuit in contact with the sensing material. A heating element is coupled with the sensing element and heats the sensing material. A sensing circuit and one or more processors are coupled with the sensing element and measures electrical response of the sensing element to an alternating electrical current applied to the sensing element at one or more different frequencies, or two or more different resistor-capacitor configurations of the sensing element. The sensing material, the sensing element, the heating element, and sensing circuit, and the one or more processors are all disposed within an exterior housing of the monolithic gas-sensing chip assembly. This housing can be relatively small (e.g., on the order of four mm by four mm) to provide a small, monolithic (or all-in-one) sensing assembly.

The one or more processors may be defined as a signal-processor and/or a control element of the system. Additionally, the monolithic gas-sensing chip assembly may also be defined as a monolithic chip assembly for sensing at least one gas analyte, or a sensing system for sensing at least one gas analyte. The sensor may be defined as a measurement system that includes components assembled together (physically, conductively, or the like) to achieve the function of sensing at least one gas analyte.

The electrical response of the sensing element to an alternating electrical current applied to the sensing element may be measured as different electrical properties. Nonlimiting examples of these measured different electrical responses of the sensing element to alternating electrical current can include impedance, admittance, reactance, susceptance, or the like. In the present specification, examples of the responses are given as impedances, however, other electrical responses of the sensing element to alternating electrical current may be produced in addition to or alternative to the impedance responses.

In one embodiment, the monolithic gas-sensing chip assembly can produce one or more electrical responses of the sensing element to an alternating electrical current applied to the sensing element that may be measured as different electrical properties.

In one embodiment, the monolithic gas-sensing chip assembly can produce one or more electrical responses of the sensing element to a combination of an alternating electrical current and direct electrical current applied to the sensing element. For example, the electrical response of the sensing element to a direct electrical current applied to the sensing element can be measured as resistance while the electrical response of the sensing element to an alternating electrical current applied to the sensing element can be measured as different electrical properties such as impedance, admittance, reactance, susceptance, or others.

The sensing element is integrated with the heating element and the sensing electronics (including the sensing circuit and the one or more processors), and the data processing circuitry. All components may be packaged into a single housing having at least one opening for a gas to interact with the sensing element.

The monolithic gas-sensing chip assembly with the gas sensor may have at least one application-specific integrated circuit packaged into a single, unitary housing, that may provide the ability to control a low detection range of the sensing system to the gas analyte, a high detection range of the sensing system to the gas analyte, a linearity of the response of the sensing system to the gas analyte, a dynamic range of measurements of the gas analyte by the sensing system, a rejection of an interfering gas analyte by the sensing system, a rejection of ambient interferences to the electrical response of the sensing element to an alternating electrical current applied to the sensing system that are measured by the sensing circuit, or correction for aging and/or poisoning of the sensing element.

Responsive to alternating electrical current being applied to the sensing element at a particular frequency, the alternating electrical current can provide a dielectric excitation to the sensing material of the sensing element at that particular frequency. Selecting the appropriate frequency (or frequencies) for this dielectric excitation is one key aspect in achieving the desired performance of the monolithic gas-sensing chip assembly. Non-limiting examples of this desired performance achieved by the dielectric excitation methodology include controlling one or more of a low detection range of the sensing system to the gas analyte, a high detection range of the sensing system to the gas analyte, a linearity of the response of the sensing system to the gas analyte, a dynamic range of measurements of the gas analyte by the sensing system, a rejection of an interfering gas analyte by the sensing system, a rejection of ambient interferences, and/or correction for aging and poisoning of the sensing element.

At least one technical effect of the various embodiments herein can provide multivariable detection by a monolithic gas-sensing chip assembly. A single sensor includes a sensing material that responds to different gases and a multi-variable transducer having independent outputs to recognize different gas responses from the sensing material. The outputs may be one or more electrical responses of the sensing system to an alternating electrical current applied to the sensing system, to a direct electrical current applied to the sensing system, and/or to a combination of an alternating electrical current and a direct electrical current applied to the sensing system. The sensing material on the multivariable transducer constitutes a multivariable sensor or sensing element. The sensing element is integrated with the heating element, the sensing electronics circuitry, and the data processing circuitry to provide a single manufactured and packaged solution. The sensor includes application-specific integrated circuits that may be controlled to meet one or more different performance characteristics of the sensing element.

FIG. 1 illustrates one embodiment of a monolithic gas-sensing chip assembly 100 or a gas sensing assembly 100. The chip assembly 100 includes a sensor 114 disposed within an exterior housing 102. The sensor 114 may be formed as an integrated sensor 114 with the exterior housing 102 such that the assembly 100 may form a single, unitary piece or component. Additionally, the sensor 114 includes plural measurement and data processing electronics within a single, unitary sensor. For example, the sensor 114 may be a multivariable sensor including a sensing element, a heating element, sensing electronic circuitry, and data processing circuitry all integrated and packaged into the exterior housing 102.

The exterior housing 102 illustrated in FIG. 1 has a substantially quadrilateral shape, alternatively the exterior housing 102 may have any alternative shape and/or size. For example, the exterior housing 102 may be circular, oblong, or another shape based on an application in which the chip assembly 100 may be used. In one or more embodiments, the exterior housing 102 may have one or more surfaces that have a largest exterior dimension that may be ten centimeters (cm), one cm, five millimeters (mm), three mm, one mm, less than one mm, or the like. In one example, the exterior housing may have a size that is about two mm by two mm in length and width, and about one mm in height. In another example, the exterior housing may have a size that is about four mm by four mm in length and width, and about two mm in height. In an embodiment, the exterior housing may have a largest exterior dimension that is no longer than ten mm. In a preferred embodiment, the exterior housing may have a largest exterior dimension that is no longer than four mm. In a more preferred embodiment, the exterior housing may have a largest exterior dimension that is no longer than two mm. Optionally, the exterior housing may have any alternative shape and/or size.

In one or more embodiments, the exterior housing 102 may have a shape that is substantially common with a shape of the sensor 114. For example, the shape and/or size of the sensor 114 may be substantially concentric with the shape and/or the size of the exterior housing 102. Optionally, the sensor 114 may have a shape that is unique to the shape of the exterior housing 102. For example, the sensor 114 may have a shape that is cubical, and the exterior housing 102 may have a shape that is oval. In another embodiment, the sensor 114 may be shaped and/or sized to substantially fill a space within or inside of the exterior housing 102. Optionally, the sensor 114 may be shaped and/or sized to partially fill a space within or inside the exterior housing 102.

The sensor 114 may be entirely contained within the one or more surfaces of the exterior housing 102. For example, in the illustrated embodiment of FIG. 1, the entire sensor 114 is disposed inside a body of the exterior housing 102. Optionally, one or more surfaces, components, features, or the like, of the sensor 114 may be disposed outside of one or more surfaces of the exterior housing 102.

The exterior housing 102 may also include one or more openings 106. The one or more openings 106 may have a shape and/or a size to allow a fluid to interact with the sensor 114. Optionally, one or more of the openings 106 may allow exhaust from the sensor 114 to be directed out of the exterior housing 102. Optionally, one or more openings may allow fluid to enter the exterior housing 102 and allow exhaust to exit the exterior housing 102. The openings 106 may be disposed on one or more different surfaces of the exterior, each opening 106 may have a uniform or unique shape and/or size as each other opening 106, a common or unique number of openings may be disposed on different surfaces of the external housing 102, or the like.

The chip assembly 100 may be partially disposed in, on, or within a fluid reservoir 112. Alternatively, the assembly 100 may be set in a flow path of the fluid outside of the fluid reservoir 112, such as coupled to in-line connectors in fluid communication with the fluid reservoir that define a flow path. The fluid reservoir 112 may be in a form of a vessel with controlled volume or in a form of an open area such as an indoor facility (e.g., a room, a hall, a house, a school, a hospital, a confined space, or the like), or in the form of an outdoor facility (e.g., stadium, a gas-production site, a seashore, a forest, or the like). In one embodiment, the sensor 114 of the monolithic gas-sensing chip assembly 100 may provide continuous monitoring of the fluid within the reservoir or flow path. In one or more embodiments, the sensor 114 may be an impedance gas sensor, an electromagnetic sensor, a photonic sensor, an electronic sensor, a hybrid sensor, or another type of sensor. In another embodiment, the sensor 114 may be a multivariable gas sensor 114 with at least two or more outputs that are substantially independent of each other output. In another embodiment, the sensor 114 may be a single-output sensor wherein the sensor 114 outputs discrete digital outputs, such as discrete single-bit outputs. The discrete single-bit output can also be defined as a threshold output Optionally, the multivariable gas sensor may be a sensor array.

Figure 2:
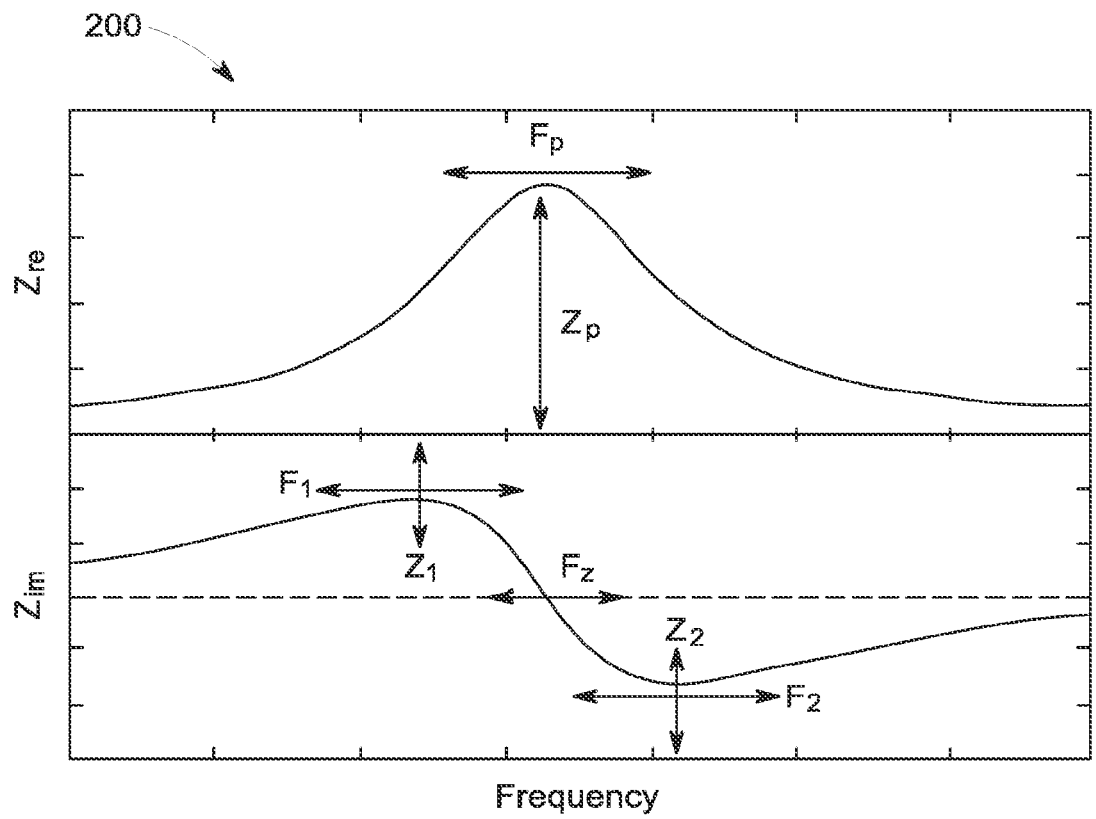
FIG. 2 illustrates a graph of a measured response corresponding to a resonance impedance response of an embodiment of a sensor, in accordance with one embodiment.
Figure 3:
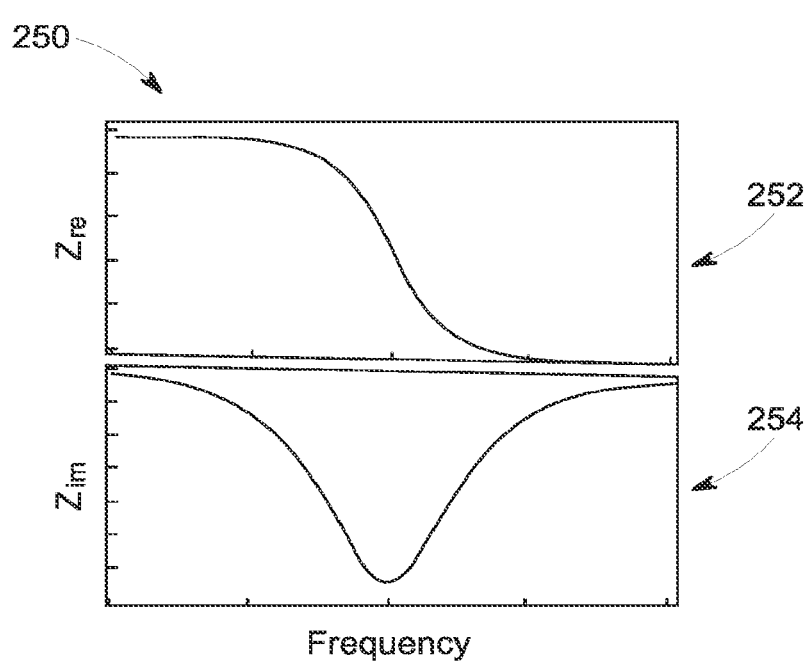
FIG. 3 illustrates a graph of a measured response corresponding to a non-resonance impedance response of a sensor, in accordance with one embodiment.

The sensor 114 may detect characteristics or properties of the fluid via a resonant or non-resonant impedance spectral response. In one or more embodiments, one or more inductor-capacitor-resistor resonant circuits (LCR resonators) of the sensor 114 may measure the resonant impedance spectral response of the sensor. A non-resonant impedance spectral response is measured when the circuit does not contain an inductor. For example, FIG. 2 illustrates a graph 200 of a measured response corresponding to a resonance impedance response of an embodiment of a sensor, in accordance with one embodiment. FIG. 3 illustrates a graph 250 of a measured response corresponding to a non-resonance impedance response of a sensor, in accordance with one embodiment. The resonant or non-resonant impedance spectrum of the sensor 114 in proximity to the fluid varies based on sample composition and/or components and/or temperature. The measured resonant or non-resonant impedance values Z' 252 (which may be the real part of impedance, Zre) and Z" 254 (which may be the imaginary part of impedance, Zim) reflect the response of the sensor 114 to the fluid.

Other embodiments of the inventive subject matter described herein include other designs of sensors besides resonant and non-resonant impedance sensors. Other sensors can be capacitor sensors, electro-mechanical resonator sensors (e.g., tuning forks, cantilever sensors, acoustic device sensors), thermal sensors, optical sensors, acoustic sensors, photoacoustic sensors, near-infrared sensors, ultraviolet sensors, infrared sensors, visible light sensors, fiber-optic sensors, reflection sensors, multivariable sensors, or single-output sensors. The sensor may generate electrical or optical stimuli in response to measured gas in ambient air at an industrial, residential, military, construction, urban, and any other known site or in measured gas in transformer oil or in isolating fluid. The insulating fluid of an electrical transformer may be insulating oil, mineral oil, synthetic oil, vegetable oil, and any other appropriate insulating fluid.

Exemplary existing and emerging applications of the monolithic gas-sensing chip assemblies described in this application include environmental monitoring and protection, industrial safety and manufacturing process control, monitoring of agricultural emissions, public safety, medical systems, wearable health and fitness, automation of residential homes and industrial buildings, transportation, and retail. Nonlimiting examples of classes and types of measured gases and volatiles of interest for these applications may include environmental background (e.g., $O_2$, $CO_2$, $H_2O$), transportation, industrial, and/or agricultural atmospheric pollutants (e.g., $CO_2$, CO, $O_3$, $H_2S$, $NH_3$, $NO_x$, $SO_2$, $CH_4$, industrial fumes, waste odors, or the like), breath biomarkers (e.g., NO, $H_2S$, $NH_4$, acetone, ethane, pentane, isoprene, hydrogen peroxide, or the like), and public and/or homeland safety hazardous volatiles (e.g., toxic industrial chemicals, chemical warfare agents, explosives, or the like). Diverse types of volatiles are needed to be monitored over their broad range of concentrations ranging from part-per-trillion to percent, at times mixed with chemical interferences such as ubiquitous variable background (e.g., indoor and/or outdoor urban air, industrial air, human odors and breath, exhaust such as of transportation engines, or the like), and at expected operation temperatures (e.g., ambient indoor and outdoor temperatures, body temperature, exhaust of transportation engines).

The measured fluids may be gases of different origin. Nonlimiting examples of the origin of gases include emissions from humans, industrial emissions, biogenic emissions, thermogenic emissions, agricultural emissions, volatile by-products of metabolic processes of humans and animals, volatile emissions from solvents, volatile products of volatilization of particles, volatile products of sublimation of materials, volatile products of combustion of materials, or the like.

An electrical field may be applied to a sensing material or sensing film of the sensor 114 via electrodes. The distance between the electrodes and the electrodes geometry as well as the applied periodic voltage to the electrodes, may define the magnitude of the electric field applied to the sensor 114 (e.g., to the sensing material or film). The electrodes may be in direct contact with the sensing material. For example, the sensor 114 may be a combination of a sensing region and associated circuits and/or the sensing region may be coated with the sensing material. The sensing material may be semiconductor material, a metal oxide material, a nanocomposite material or nanomaterial having grain sizes ranging from about 0.1 nanometer to about 100 nanometers or to about 999 nanometers, or a mesomaterial having grain sizes ranging from about one micrometer to about ten micrometers or to about 999 micrometers.

Suitable sensors may include single use or multi-use sensors. A suitable multi-use sensor may be a re-usable sensor that may be used during the lifetime of a system in which it may be incorporated into. In one embodiment, the sensor may be a single use sensor that may be used during all or part of a reaction or process.

Data from the sensor 114 may be acquired via data acquisition circuitry, which may be associated with the sensor or which may be associated with a control system, such as a controller or workstation 122 including data processing circuitry, where additional processing and analysis may be performed. The controller or workstation 122 may include one or more wireless or wired components, and may also communicate with the other components of the chip assembly 100. Suitable communication models include wireless, such as bi-directional communication link 124, or wired. At least one suitable wireless model includes radio frequency devices, such as radio frequency identification (RFID) wireless communications. Other wireless communication modalities may be used based on application specific parameters. Nonlimiting examples include near field communication (NFC), Bluetooth, Wi-Fi, 3G, 4G, 5G, and others. For example, where there may be electromagnetic field (EMF) interference, certain modalities may work where others may not. The data acquisition circuitry optionally can be disposed within the sensor 114. Other suitable locations may include disposition being within the workstation 122. Further, the workstation 122 can be replaced with a control system of the whole process where the sensor and its data acquisition circuitry may be connected to the control system of the whole process.

Additionally, the data acquisition circuitry may receive data from one or more sensors 114 (e.g., multiple sensors positioned at different locations in or around the fluid reservoir), one or more different sensors 114 disposed within or outside of the chip assembly 100, or the like. The data may be stored in short term and/or long term memory storage devices, such as archiving communication systems, which may be located within or remote from the chip assembly and/or reconstructed and displayed for an operator, such as at the operator workstation. The sensors 114 may be positioned on or in oil fluid reservoirs, associated piping components, connectors, flow-through components, and any other relevant process components.

The data acquisition circuitry may include one or more processors for analyzing the data received from the sensor 114. For example, the one or more processors may be one or more computer processors, controllers (e.g., microcontrollers), or other logic-based devices that perform operations based on one or more sets of instructions (e.g., software). The instructions on which the one or more processors operate may be stored on a tangible and non-transitory computer readable storage medium, such as a memory device. The one or more processors may determine that the single output and/or multiple outputs may match, partially match, or be within a predetermined range of known standard digital protocols of wireless communications.

In addition to displaying the data, the operator workstation 122 may control the above-described operations and functions of the assembly 100. The operator workstation 122 may include one or more processor-based components, such as general purpose or application-specific computers or processors. In addition to the processor-based components, the computer may include various memory and/or storage components including magnetic and optical mass storage devices, internal memory, such as RAM chips. The memory and/or storage components may be used for storing programs and routines for performing the techniques described herein that may be executed by the operator workstation 122 or by associated components of the assembly 100. Alternatively, the programs and routines may be stored on a computer accessible storage and/or memory remote from the operator workstation 122 but accessible by network and/or communication interfaces present on the computer of the workstation. The computer may also comprise various input/output (I/O) interfaces, as well as various network or communication interfaces. The various I/O interfaces may allow communication with user interface devices, such as a display, keyboard, electronic mouse, and printer, that may be used for viewing and inputting configuration information and/or for operating the imaging system. Other devices, not shown, may be useful for interfacing, such as touchpads, heads up displays, microphones, and the like. The various network and communication interfaces may allow connection to both local and wide area intranets and storage networks as well as the Internet. The various I/O and communication interfaces may utilize wires, lines, or suitable wireless interfaces, as appropriate or desired.

In one or more embodiments, the gas-sensing chip assembly 100 may be a wearable chip assembly, may be held within a wearable and/or non-wearable transferrable object (e.g., a frame of military or industrial eyeglasses), or the like. The wearable device may be worn by a subject (e.g., a human, any mammal subject, a plant subject, or the like), may be removably coupled or integrated with an article worn by a subject (e.g., a shirt, pants, safety vest, safety personal protection clothing, eyeglasses, hat, helmet, hearing device, or the like), or may be any alternative device that may be transferrable such that sensor can be moved between different positions, may be stationary or substantially stationary, or the like. Optionally, the chip assembly 100 may be disposed on and/or within an unmanned vehicle (UMV) or may be used to monitor environments with unmanned platforms, such as aerial, ground-based, above-ground-based, under-ground-based, under-water-based, and other platforms.

In one or more embodiments, one or more of the monolithic gas-sensing chip assemblies described herein may be configured to be implanted in a subject. In one example, the monolithic gas-sensing chip assembly having at least one sensor may be implantable. In certain embodiments, one or more of such the monolithic gas-sensing chip assemblies may be implanted in subjects, such as living beings or non-living objects. By way of example, the chip assemblies may be implanted in subjects and fluids such as, but not limited to, animals, humans, soil (e.g., outdoor soil, or soil of indoor plants), industrial infrastructure, components, or any combination thereof. The monolithic gas-sensing chip assemblies with at least one sensor may be implanted in different objects, articles, items, humans, and/or animals for real-time in-vivo monitoring of chemical, biological, and/or physical parameters.

Non-limiting examples of implanting or incorporation of the monolithic gas-sensing chip assemblies with at least one sensor into an industrial or consumer infrastructure or components may include stationary industrial infrastructure, moving industrial infrastructure, roads, buildings, bridges, vehicles, wind power turbines, wind power turbine blades, aircraft engines, single-use and multiple use bioprocess components, oil drill bits, pipelines, consumer products, wireless computers, mobile computers, cradles of mobile devices, cases of mobile devices, cases of goods, smartphones, tablets, personal digital assistants, watches, industrial remote control units, consumer remote control units, television remote control units, home remote control units, home appliances, consumer appliances, clothing, footwear, helmets, sports equipment, laboratory equipment, laboratory analytical instrumentation, filters, filter cartridges, separators, separation columns, purification columns, containers, reactors, and other articles and items. The operating temperature of the monolithic gas-sensing chip assemblies can range from −85 degrees Celsius to 380 degrees Celsius.

Figure 4:
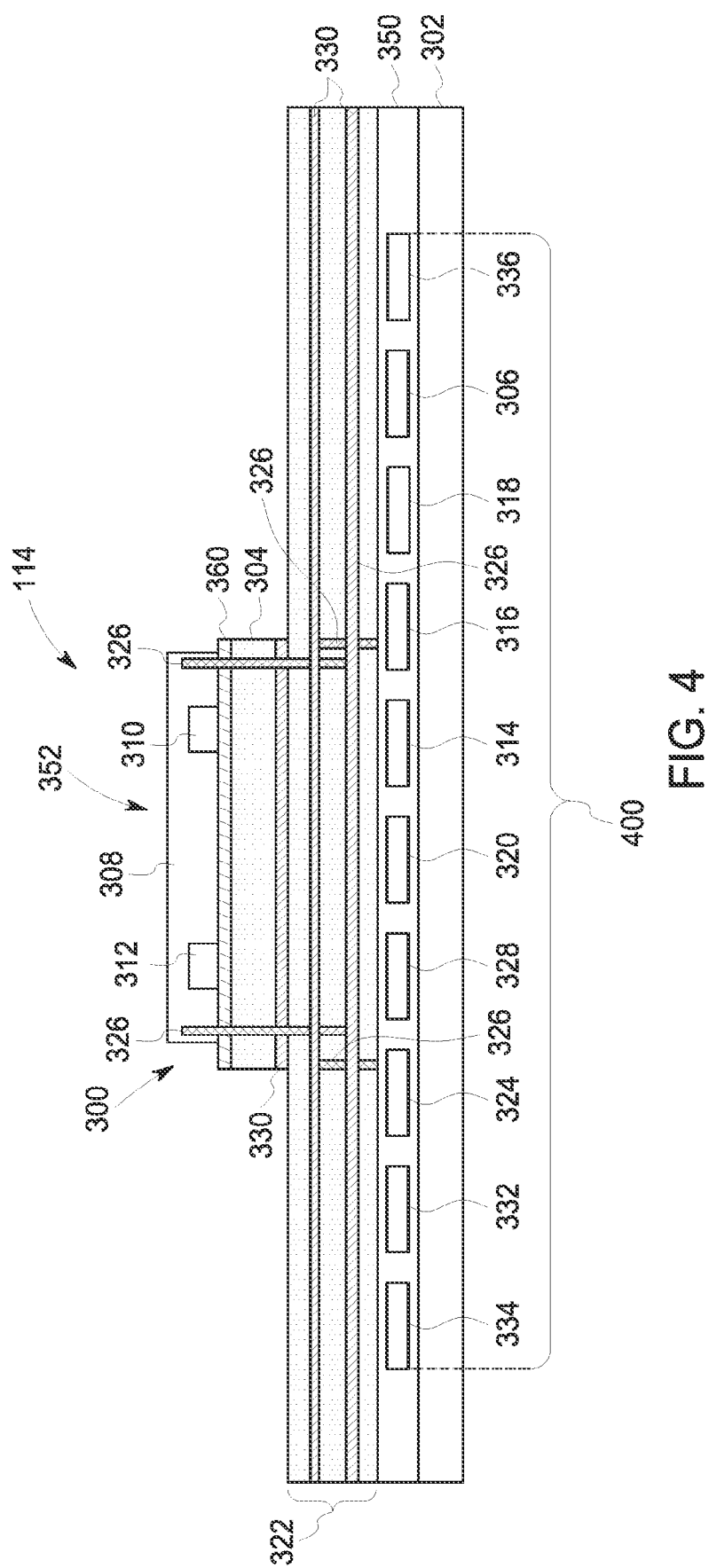
FIG. 4 illustrates a cross-sectional view of a sensor in accordance with one embodiment.

FIG. 4 illustrates a non-limiting example of a cross-sectional view of the sensor 114 in accordance with one embodiment. The sensor 114 may represent another version of the sensors or sensing systems described herein. The sensor 114 includes, among other things, a sensing system 300, a heating element 304, a device layer 350, and one or more electrical routing layers 322 electrically and conductively coupling the sensing system 300 with sensing circuitry 400 including plural different measurement and data processing electronics of the device layer 350 through plural different dielectric insulative layers 330. The sensing system 300, the sensing circuitry 400 of the device layer 350, the electrical routing layers 322, and dielectric insulative layers 330 are all disposed inside the exterior housing 102 illustrated in FIG. 1.

The sensing system 300 examines a fluid in contact with the sensor 114. The fluid may be a gas, a liquid, a gas-liquid mixture, a solid, particles or particulate matter, or the like, containing one or more analyte gases therein. The fluid may be transformer oil or any insulating fluid of an electrical transformer that is installed and/or disposed of below a ground level, above the ground level, near to the ground level, or any other position. In another embodiment, the fluid may be a gas or fuel, such as a hydrocarbon-based fuel. One example of the fluid is natural gas that is supplied to a powered system (e.g., a vehicle, or a stationary generator set) for consumption. Other examples of such a fluid can include gasoline, diesel fuel, jet fuel or kerosene, bio-fuels, petrodiesel-biodiesel fuel blends, natural gas (liquid or compressed), and fuel oils. Another example of the fluid is indoor or outdoor ambient air. Another example of the fluid is air at an industrial, residential, military, construction, urban, and any other known site. Another example of the fluid is ambient air with relatively small concentrations of hydrocarbons and/or other pollutants. Another example of the fluid is at least one gas dissolved in an industrial liquid such as transformer oil, bioprocess media, fermentation media, wastewater, and any other. Another example of the fluid is the at least one gas dissolved in a consumer liquid such as milk, non-alcoholic beverages, alcoholic beverages, cosmetics, and any other. Another example of the fluid is at least one gas dissolved in a body liquid such as blood, sweat, tears, saliva, urine, and any other.

The sensing system 300 includes a substrate 360, such as a dielectric material, a sensing film or sensing material 308, and one or more electrodes 310, 312. In one or more embodiments, the sensing material 308 in contact with the electrodes 310, 312 forms a sensing element. 352. The sensing material 308 is exposed to, in contact with, in indirect contact with, or the like, at least one analyte gas. The sensing material 308 can include one or more materials to perform a function of predictably and reproducibly affecting the impedance sensor response upon interaction with the environment. For example, a metal oxide, such as $SnO_2$, may be deposited as the sensing material 308.

One or several heating elements 304, such as high resistance bodies, are coupled a different side of the substrate 360 relative to the sensing material 308. In one or more embodiments, the sensing material 308 may be a metal oxide film coupled with or disposed onto a side of the substrate 360. Alternatively, the sensing system 300 may be devoid the substrate 360 and the metal oxide film of the sensing material 308 may be coupled directly with the heating element 304. The substrate 360 may be a dielectric insulative layer disposed between the heating elements 304 and the sensing material 308. Optionally, two or more insulative layers, one or more electrical routing layers, or another layer may be disposed between the heating elements 304 and the sensing material 308. The heating elements 304 receive electric current from a heating controller 324, which represents hardware circuitry that conducts the heater current or voltage to the heating elements 304 to control a temperature of the sensing film or sensing material 308. For example, in one or more embodiments of the inventive subject matter described herein, the sensing material 308 utilizes a metal oxide sensing film.

The heating element 304 may be designed as a single element heater, or as multiple elements distributed across the sensing system 300. The distributed heating element allows for lower or a reduced amount of current necessary to be driven by the heating controller 324 relative to a single heating element. In one embodiment, the sensing system 300 is heated substantially uniformly to a predetermined operating temperature. In another embodiment, a controlled temperature profile is generated and a sensor output over plural different thermal configurations may be used as a reference. In another embodiment, on chip temperature sensors may be used with the monolithic gas-sensing chip assembly 100 to measure and/or control the temperature of the heating element 304, for sensor response calibration, or the like.

Additionally, the heating element 304 may be a metal layer or may be one or more heating elements that may be used as a heater for the sensor 114. The metal layer of the heating element 304 may constitute an existing interconnect layer on the semiconductor process or may include additional metal deposited to perform the heating function. In one embodiment, the metal may be deposited utilizing sputtering, chemical vapor deposition (CVD) techniques, additive printing, or the like. The shape, size, and/or composition of the heating element 304 is selected to provide target heating characteristics. Optionally, the heating element 304 may be a resistive layer where the materials of the resistive layer may be metal, polymer, nanocomposite, polysilicon, or the like.

The sensing electrodes 310, 312 are coupled with and/or disposed in the sensing material 308 in the illustrated embodiment. The sensing electrodes 310, 312 are conductive bodies that are conductively coupled with the one or more measurement and/or data processing electronics of the sensing circuitry 400 disposed within the device layer 350 via one or more through-substrate vias 326. The through-substrate vias 326 extend or pass through one or more of the dielectric insulative layers 330 and one or more of the electrical routing layers 322 between the sensing system 300 and the electronics of the device layer 350 to conductively couple the sensor element 300 with the one or more processors of the sensing circuitry 400.

In one or more embodiments, the sensing electrodes 310, 312 may be coated with a sensing material that is responsive to one or more analyte gases of interest. The one or more processors of the sensing circuitry 400 may also direct the sensing electrodes 310, 312 to apply the electrical stimuli at one frequency, such as an electrical excitation frequency or a single excitation frequency.

Suitable interdigital electrode structures for probing a fluid sample include two- and four-electrode structures. Suitable materials for electrodes include stainless steel, platinum, gold, noble metals, and others. Suitable electrodes may be formed using metal etching, screen-printing, inkjet-printing, and mask-based metal deposition techniques. The thickness of fabricated electrodes on the substrates may be in the range from about 10 nanometers to about 1000 micrometers. The materials for the interdigital electrode structures, substrate, sensing layer, and electrode formation methods may be selected based at least in part on the application specific parameters.

Suitable materials of the dielectric insulative layers 330 may include silicon dioxide, silicon nitride, alumina, ceramics, and others. The sensing electrode structure of the dielectric insulative layers 330 includes a semiconducting sensing material 308 deposited on at least a portion of the electrode structure. Optionally, suitable examples of sensing materials, sensing films, or coatings include semiconducting materials, n-type semiconducting materials, p-type semiconducting materials, metal oxides, composite materials, inorganic materials, organic materials, polymeric materials, formulated materials, nanocomposite materials, any known sensing material, or the like. For example, in one or more embodiments described herein, the semiconducting sensing material 308 may be tin dioxide $SnO_2$ or any alternative material.

In one or more embodiments, the plural different measurement and data processing electronics of the sensing circuitry 400 disposed within the device layer 350 may include a sensor system controller 306, the heating controller 324, a sensing circuit 328, a sensor amplifier 314, a memory 316, data acquisition circuitry 318, a resistor-capacitor electrical circuit 320, an impedance system 332, a modifier assembly 334, and a resistance detector system 336. In the illustrated embodiment, the measurement and data processing electronics of the device layer 350 are built into a single layer of the sensor 114. The sensing electrodes 310, 312 may be directly and/or indirectly conductively coupled with each of the heating controller 324, the sensing circuit 328, the sensor amplifier 314, the memory 316, the data acquisition circuitry 318, the resistor-capacitor electrical circuit 320, the impedance system 332, the modifier assembly 334, and/or the resistance detector system 336.

Each of the heating controller 324, the sensing circuit 328, the sensor amplifier 314, the memory 316, the data acquisition circuitry 318, the resistor-capacitor electrical circuit 320, the impedance system 332, and the modifier assembly 334 may have one or more processors that include one or more microprocessors, field programmable gate arrays, and/or integrated circuits that may be separate and distinct from one or more processors of each other of the heating controller 324, the sensing circuit 328, the sensor amplifier 314, the memory 316, the data acquisition circuitry 318, the resistor-capacitor electrical circuit 320, the impedance system 332, and the modifier assembly 334. Optionally, one or more of the heating controller 324, the sensing circuit 328, the sensor amplifier 314, the memory 316, the data acquisition circuitry 318, the resistor-capacitor electrical circuit 320, the impedance system 332, the modifier assembly 334, and the resistance detector system 336 may have one or more common or shared processors with one or more other electronic system of the sensing circuitry 400. In one embodiment, the measurement and data processing electronics of the sensing circuitry 400 may be a single electronics chip, or alternatively may be configured as one or more multichip modules in a 2.5D package or a 3D package.

The one or more processors of the sensing circuitry 400 may also receive one or more electrical signals from the sensing electrodes 310, 312 that represents the electrical impedance or impedance response of the sensing system 300 during exposure of the sensing material 308 to the fluid sample. The sensor system controller 306 can examine the electrical impedance of the sensing system 300 in order to determine the presence and/or amount (e.g., concentration) of one or more analyte gases in the environment to which the sensing material 308 is exposed, as described herein. For example, an impedance system 332 of the device layer 350 may provide scanning capability to measure sensor impedance responses at a single or at plural discrete frequencies. Alternatively, the impedance system 332 may provide capabilities of the sensor 114 to measure sensor impedance responses across a frequency range.

In one or more embodiments, the sensing system 300 can include the resistor-capacitor RC electrical circuit 320 with one or more of the resistor R and capacitor C components changed by the presence of one or more analyte gases of interest. For example, the resistor-capacitor electrical circuit 320 may change the resistance and/or capacitance of the resistor-capacitor electrical circuit 320. In one or embodiments, the circuitry of the sensor system controller 306 may be able to perform impedance measurements of the sensing system 300 to determine an impedance response to one or more analyte gases of interest. Impedance measurements may be performed at one or more different frequencies or at one or more different RC configurations of the sensing system 300. For example, the sensing circuit 328 of the sensing circuitry 400 may measure impedance responses of the sensing system 300 at different frequencies, at different resistances of the RC electrical circuit, at different capacitance of the RC electrical circuit, or any combination of two or more therein.

The plural different measurement and data processing electronics of the sensor 114 may vary based on the application for which the sensor is being used. For example, the sensor 114 may be referred to as an application-specific integrated circuit gas sensor. One or more of the different measurement and data processing electronics (e.g., the sensing circuit 328, the sensor amplifier 314, the memory 316, the data acquisition circuitry 318, the resistor-capacitor electrical circuit 320, the impedance system 332, the modifier assembly 334, the resistance detector system 336, or the like) may be included within the sensor 114 or may be omitted from the sensor 114 based on the specific application of use of the sensor. Different methods of operating the sensor 114 to control operation of the sensor 114 will be described in more detail below.

In the illustrated embodiment of FIG. 4, the sensing system 300 is stacked on top of the heating element 304, the heating element 304 is stacked on top of the device layer 350, and the device layer 350 is stacked on top of the handle wafer layer 302. The sensing system 300 is separated from the heating element 304 by a single dielectric insulative layer 330. The heating element 304 is separated from the sensing circuitry 400 of the device layer 350 by three electrical routing layers 322 and three dielectric insulative layers 330. Optionally, any number of electrical routing layers 322 and any number of dielectric insulative layers 330 be disposed between the sensing system 300 and the heating element 304, and/or between the heating element 304 and the device layer 350. For example, a dielectric insulative layer 330 is disposed between the heating element 304 and the sensing circuitry 400, including at least the sensing circuit 328 and the data processing electronics of the sensing circuitry 400, of the device layer 350.

In the illustrated embodiment, the heating element 304 is a metal layer that is disposed between the sensing system 300 and the sensing circuitry 400 of the device layer 350, including the sensing circuit 328. For example, the heating element 304 operates as an interconnect (e.g., a thermal and conductive interconnect) between the sensing system 300 and the sensing circuitry 400 of the device layer 350.

In one or more embodiments, the measurement and data processing electronics of the sensing circuitry 400 may be built in conventional complementary metal-oxide-semiconductor (CMOS) silicon electronics, or in any other semiconductor process. In one embodiment, a high temperature-compatible may be utilized to allow for close integration of the measurement and data processing electronics of the sensing circuitry 400 with the heating element 304. For example, the high temperature-compatible substrate may be a semiconductor substrate such as silicon-on-insulators, silicon carbide (SiC), gallium nitride (GaN), or the like.

In the illustrated embodiment of FIG. 4, each dielectric insulative layer 330 has a common thickness relative to each other insulative layer 330, but alternatively the insulative layers may have any alternative shape and/or size that may be common or unique to each other insulative layer. Similarly, each electrical routing layer 322 has a common shape and size relative to each other electrical routing layer 322, but alternatively the electrical routing layers may have any alternative shape and/or size that may be common or unique to each other electrical routing layer.

In the illustrated embodiment of FIG. 4, all of the components of the sensor 114, including the sensing system 300, the heating element 304, and the sensing circuitry 400 that provides the sensing electronics circuitry and data processing circuitry are packaged in the exterior housing 102 of the chip assembly 100. The sensing system 300 is integrated with the heating element 304 and the different components of the device layer 350. The one or more openings 106 of the exterior housing 102 allow for a fluid to come into direct or indirect contact with the sensing system 300 of the sensor 114 inside the exterior housing 102.

The device layer 350 may include components, circuits, processors, or the like, that enable to sensor 114 to change resistance R and/or capacitance C components of the resistor-capacitor electrical circuit 320 by the presence of one or more gases, or by electronic control of the circuit 320. Optionally, the impedance system 332 may perform impedance measurements of the sensing system 300 to determine its response to gases. The impedance measurements may be performed at different frequencies, such as at two or more different frequencies, or at two or more different resistance R and capacitance C configurations of the sensing system 300. Optionally, one or more of the measurement and/or data processing electronics of the device layer 350 may be capable of controlling one or more of a low detection range of the sensing system 300 to one or more analyte gases of interest, a high detection range of the sensing system 300 to one or more analyte gases of interest, a response linearity of the sensing system 300 to one or more analyte gases of interest, a dynamic range of measurements of one or more analyte gases of interest, a rejection of one or more interfering gases by the sensing system 300, a rejection of ambient interferences that may affect the electrical response of the sensing system to the alternating electrical current applied to the sensing system that may be measured by the sensing circuit, a correction for aging or poisoning of the sensing system 300, or the like.

In one or more embodiments, ambient interferences may be any effect that may undesirably affect an accuracy of gas measurements. For example, nonlimiting examples of such ambient interferences may include ambient relative humidity, different interferent gases, ambient temperature, barometric pressure, vibrations, or the like.

Figure 5:
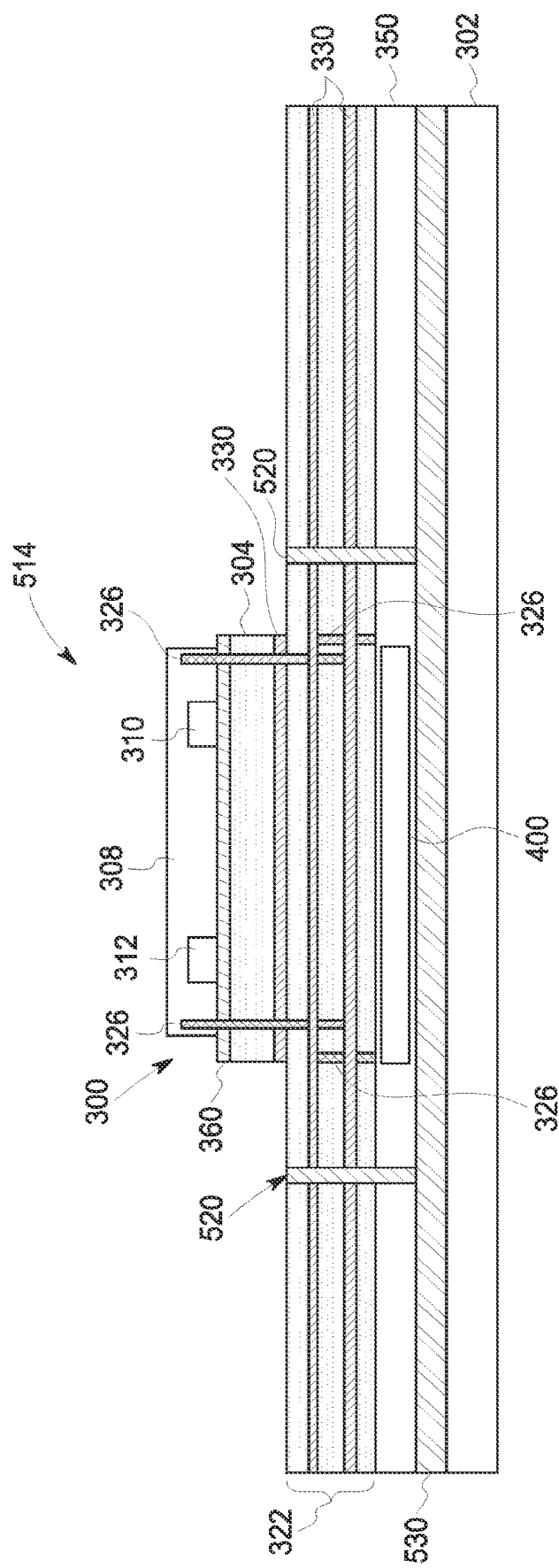
FIG. 5 illustrates a cross-sectional view of a sensor in accordance with one embodiment.

FIG. 5 illustrates a non-limiting example of a cross-sectional view of a sensor 514 in accordance with one embodiment. Like the sensor 114 illustrated in FIG. 4, the sensor 514 includes the sensing system 300 that is coupled with the heating element 304. Plural electrical routing layers 322 and dielectric insulative layers 330 are disposed between the heating element 304 and the sensing circuitry 400 disposed within the device layer 350. The sensing circuitry 400 may include measurement and/or data processing electronics such as, but not limited to, the sensor amplifier 314, the memory 316, the data acquisition circuitry 318, the resistor-capacitor electrical circuit 320, the heating controller 324, the sensing circuit 328, the impedance system 332, the modifier assembly 334, resistance detector system 336. Plural through-substrate vias 326 conductively couple the sensing system 300 with the heating element 304, conductively couple the sensing system 300 with the sensing circuitry 400, and conductively couple the heating element 304 with the sensing circuitry 400.

Alternatively, the sensor 514 also includes one or more trench isolators 520 that extend through the plural different layers of the sensor 514. In the illustrated embodiment, the sensor 514 includes two trench isolators 520, but may include any number of trench isolators 520. The trench isolators 520 provide electrical and/or thermal isolation. For example, one or more measurement and/or data processing electronics of the sensing circuitry 400 may be separated (e.g., thermally separated, electrically separated, or thermally and electrically separated) from another measurement and/or data processing electronics via the trench isolators 520. The trench isolators 520 may be positioned within the sensor 514 to control an amount and/or direction of heat that is distributed within the sensor 514 responsive to the sensor 514 being in operation.

The sensor 514 also includes a buried oxide layer 530 that is disposed between the device layer 350 and the handle wafer layer 302. The buried oxide layer 530 may be used to thermally and/or electrically isolate the sensing circuitry 400 and/or the heating element 304 from the handle wafer layer 302. The buried oxide layer 530 may be formed in a semiconductor substrate. For example, the buried oxide layer 530 may be formed in a lower temperature semiconductor substrate than the sensing circuitry 400 of the device layer 350. In one or more embodiments, nonlimiting examples of the buried oxide layer 530 may be $SiO_2$, $Al_2O_3$, a ceramic, a dielectric, a sapphire, or the like.

Figure 6:
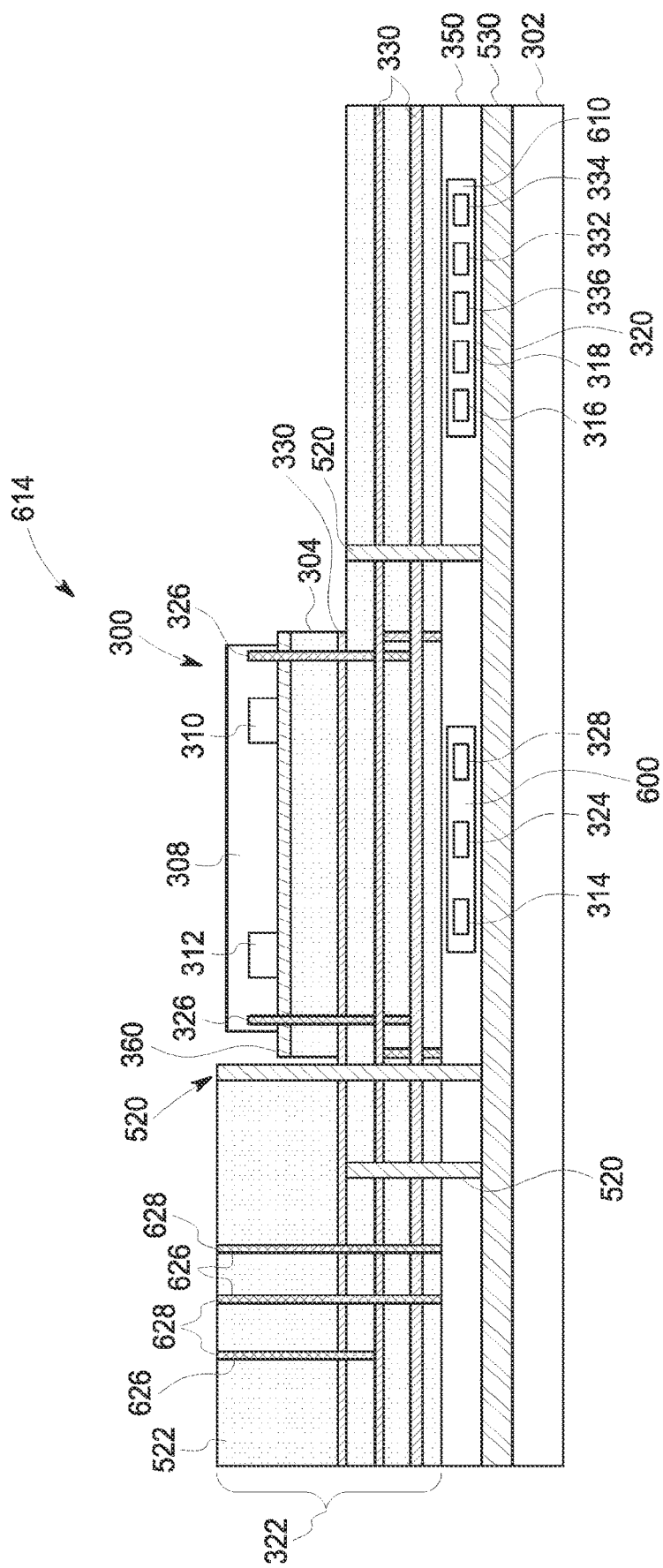
FIG. 6 illustrates a cross-sectional view of a sensor in accordance with one embodiment.

FIG. 6 illustrates a non-limiting example of a cross-sectional view of a sensor 614 in accordance with one embodiment. Like the sensor 114 illustrated in FIG. 4 and the sensor 514 illustrated in FIG. 5, the sensor 614 includes the sensing system 300 that is coupled with the heating element 304. Plural electrical routing layers 322 and dielectric insulative layers 330 are disposed between the heating element 304 and the device layer 350. Plural through-substrate vias 326 conductively couple the sensing system 300 with the heating element 304, conductively couple the sensing system 300 with first sensing circuitry 600, and conductively couple the heating element 304 with the first sensing circuitry 600.

In the illustrated embodiment of FIG. 6, at least some of the measurement and data processing electronics are separated from at least some other measurement and data processing electronics by one or more trench isolators 520. For example, the sensor amplifier 314, the heating controller 324, and the sensing circuit 328 may be grouped together as the first sensing circuitry 600, and the memory 316, data acquisition circuitry 318, resistor-capacitor electrical circuit 320, impedance system 332, modifier assembly 334, and the resistance detector system 336 may be grouped together as a second sensing circuitry 610. The components of the first and second sensing circuitry 600, 610 may be electrically separated, thermally separated, or both electrically and thermally separated from each other of the first and second sensing circuitry 600, 610. Optionally, the first sensing circuitry 600 may include any other measurement and/or data processing electronic system, or the second sensing circuitry 610 may include any other measurement and/or data processing electronic system. Optionally, the sensor 614 may include a third sensing circuitry (not shown) that may include any of the measurement and/or data processing electronics, devices, or systems.

The sensor 614 also includes the buried oxide layer 530 that is disposed between the device layer 350 and the handle wafer layer 302. The buried oxide layer 530 may be used to thermally and/or electrically isolate the first and second sensing circuitry 600, 610 and/or the heating element 304 from the handle wafer layer 302. The buried oxide layer 530 may be formed in a semiconductor substrate. For example, the buried oxide layer 530 may be formed in a lower temperature semiconductor substrate than the first and second sensing circuitry 600, 610 of the device layer 350.

The sensor 614 also includes an additional electrical routing layer 522 that is conductively coupled with the electrical routing layers 322. In the illustrated embodiment, the electrical routing layer 522 is stacked on top of the routing layers 322. The routing layer 522 extends a distance that is substantially equal to the size of the sensing system 300 such that a top surface of the routing layer 522 is substantially planar with a top surface of the sensing system 300. Plural through-substrate vias 626 extend from the device layer 350 and/or one of the electrical routing layers 322 to plural exterior contacts 628. For example, the exterior contacts 628 may allow electrical connection between one or more of the measurement and/or data processing electronics disposed within the device layer 350 and an electronic that is disposed outside of the sensor 614. For example, one or more wires may extend from a location outside of the exterior housing 102 of FIG. 1 to one or more of the exterior contacts 628 inside of the exterior housing 102.

Figure 7:
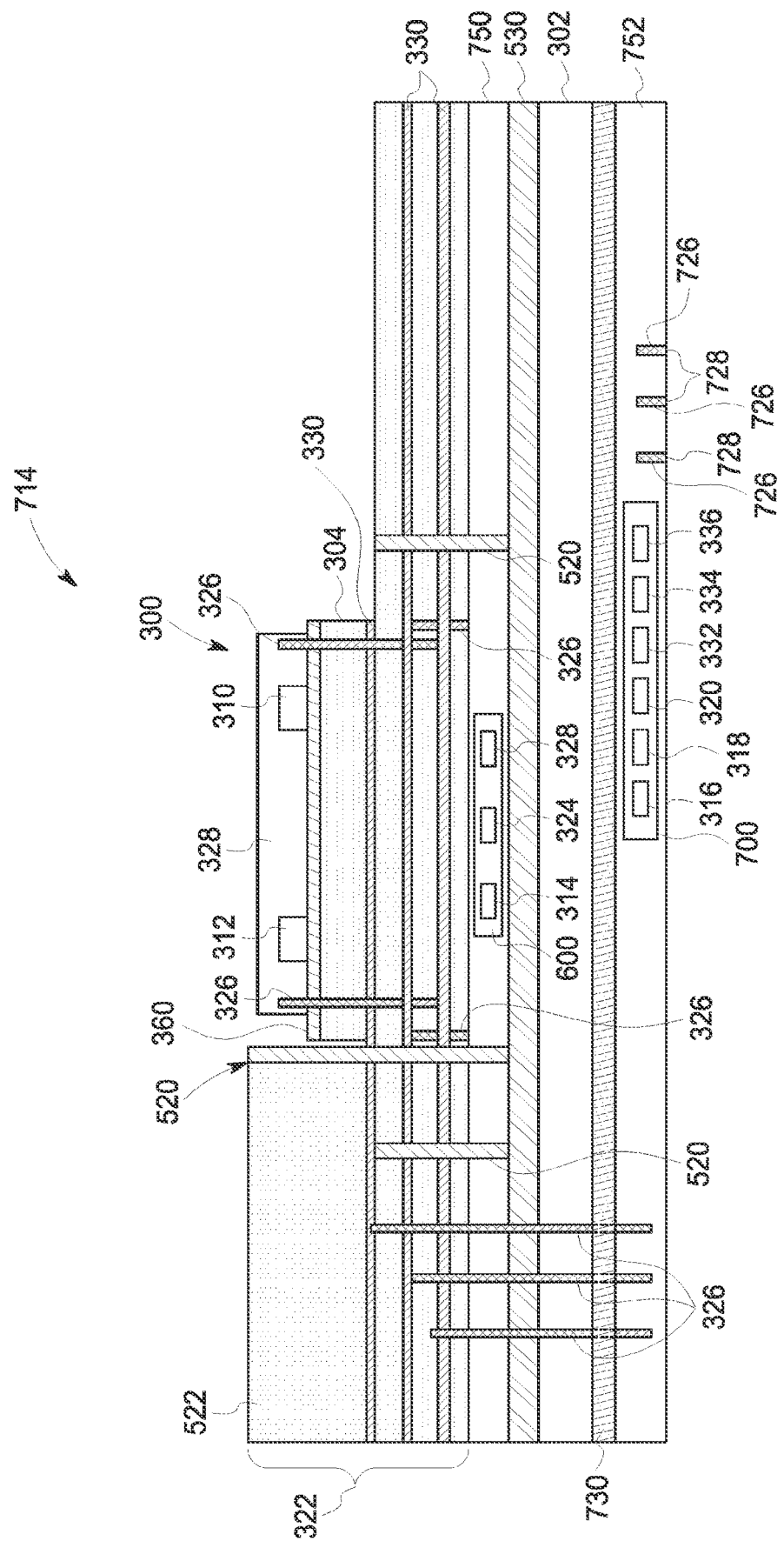
FIG. 7 illustrates a cross-sectional view of a sensor in accordance with one embodiment.

FIG. 7 illustrates a non-limiting example of a cross-sectional view of a sensor 714 in accordance with one embodiment. Like the sensors 114, 514, 614 illustrated in FIGS. 4, 5, and 6, the sensor 714 includes the sensing system 300 that is coupled with the heating element 304. Plural electrical routing layers 322 and dielectric insulative layers 330 are disposed between the heating element 304 and a first device layer 750. Plural through-substrate vias 326 conductively couple the sensing system 300 with the heating element 304, conductively couple the sensing system 300 with the first sensing circuitry 600 of the first device layer 750, and conductively couple the heating element 304 with the first sensing circuitry 600.

Like the sensor 614 illustrated in FIG. 6, at least some of the measurement and data processing electronics are separated from some other measurement and data processing electronics by one or more trench isolators 520. For example, the sensor amplifier 314, the heating controller 324, and the sensing circuit 328 may be grouped together as the first sensing circuitry 600, and the memory 316, data acquisition circuitry 318, resistor-capacitor electrical circuit 320, sensing circuit 328, impedance system 332, modifier assembly 334, and the resistance detector system 336 may be grouped together as a second sensing circuitry 700. The electronics of the first sensing circuitry 600 are disposed within the first device layer 750, and the electronics of the second sensing circuitry 700 are disposed within a second device layer 752. The electronics of the first sensing circuitry 600 may be electrically separated, thermally separated, or both electrically and thermally separated from the electronics of the second sensing circuitry 700. Optionally, the first sensing circuitry 600 may include any other measurement and/or data processing electronic systems, or the second sensing circuitry 700 may include any other measurement and/or data processing electronic systems. Optionally, the sensor 714 may include a third sensing circuitry (not shown) that may include any of the measurement and/or data processing electronics, devices, or systems, that may be disposed within the first device layer 750, the second device layer 752, or an alternative device layer (not shown).

The first device layer 750 may be a high temperature-compatible substrate and the second device layer 752 may be a lower temperature semiconductor substrate than the first device layer 750 having the sensing circuit 328 disposed therein. For example, the lower temperature semiconductor substrate of the second device layer 752 may be used to reduce an amount of heat transfer from the heating element 304 to the electronic devices of the second device layer 752. Additionally, the measurement electronics of the first device layer 750 (e.g., the sensor amplifier 314, the heating controller 324, and the sensing circuit 328) may block, or reduce an amount of heat transfer from the heating element 304 to the data processing electronics of the second device layer 752. For example, the one or more processors of the second device layer 752 may be thermally isolated, or substantially thermally isolated, from the sensing circuit 328 disposed in the high temperature-compatible substrate of the first device layer 750. For example, the semiconductor substrate of the second device layer 752 thermally isolates the processors from the sensing circuit 328. Additionally or alternatively, the semiconductor substrate may be thermally isolated from the sensing circuit 328. Optionally, the semiconductor substrate of the second device layer 752 is configured to operate at a temperature that is lower than the temperature of the sensing system 300.

In one or more embodiments, one or more of the dielectric insulative layers 330 may be manufactured of a low thermal conductivity (e.g., high thermal insulation) dielectric material to transfer heat from the heating element 304 to one or more electronic devices of the sensor 714. In one or more embodiments, one or more electronics of the sensor 714 may be built in a high temperature electronics process (e.g., the sensing circuit 328 of the first device layer 750), and a different electronic of the sensor 714 (e.g., the data acquisition circuitry 318 of the second device layer 752) may be manufactured in a lower or reduced temperature conventional process relative to the sensing circuit 328.

The electronics disposed in a single die may be stacked onto or otherwise coupled with the electronics in a different single die. The two dies may be conductively, electrically, and/or galvanically coupled with each other by a through-substrate vias process. For example, one or more through-substrate vias 326 may extend at least between the two different dies of the first and second device layers 750, 752. In the illustrated embodiment, the sensing circuit 328 of the first device layer 750 and the electronics of the second device layer 752 at stacked on top of each other and are conductively coupled with each other by one or more through-substrate vias 326. Additionally, the first device layer 750 may act as a thermal barrier between the higher or increased temperature of the heating element 304, and the lower or reduced temperature capability data processor die of the second device layer 752.

Additionally, the first device layer 750 comprising the sensing circuit 328 disposed therein, and the second device layer 752 comprising the one or more processors of the second circuitry 700 may be thermally isolated from the heating element 304. For example, one or more dielectric insulative layers 330 may be disposed between the heating element 304 and the first device layer 750, and between the heating element 304 and the second device layer 752, to thermally isolate, or substantially thermally isolate the heating element 304 from the sensing circuit 328 and the one or more processors of the second circuitry 700. Optionally, the sensor 714 may have any alternative configuration that thermally isolates and/or thermally couples one or more elements with another element.

The first and second device layers 750, 752 are separated from each other by a first buried oxide layer 530, the handle wafer layer 302, and a second buried oxide layer 730. The first and second buried oxide layers 530, 730 provide electrical and thermal isolation of the electronics of the second device layer 752 from the electronics of the first device layer 750. Additionally, the first and second buried oxide layers 530, 730 provide thermal isolation of the electronics of the second device layer 752 from the heating element 304.

The sensor 714 includes plural through-substrate vias 726 that extend from the second device layer 752 to one or more corresponding exterior contacts 728. For example, the exterior contacts 728 may allow electrical connection between one or more of the electronics disposed within the second device layer 752 and one or more electronics that are disposed outside of the sensor 714 (not shown). For example, one or more wires may extend from a location outside of the exterior housing 102 of FIG. 1 (not shown) to one or more of the exterior contacts 728 inside of the exterior housing 102. The through-substrate vias 726 may be utilized to provide a conductive interconnect on a side of the sensor 114, such as a backside or any exterior side of the sensor 114. Optionally, the sensor 714 may include one or more through-substrate vias (not shown) that may extend from the first device layer 750 to corresponding exterior circuits (not shown) to allow an electrical connection between one or more of the electronics of the first device layer 750 and one or more electronics disposed outside of the sensor 714 and/or outside of the exterior housing 102.

In one or more embodiments, the sensing system 300 may be disposed directly on the first device layer 750 or proximate to the first device layer 750 having the sensing circuit 328 relative to the sensing system 300 and, for example, the second device layer 752. For example, the sensing system 300 is disposed proximate to the sensing circuit 328. Optionally, the electrical routing layers 322 disposed between the heating element 304 and the sensing system 300 may be removed, and the measurement electronics of the first device layer 750 (e.g., the sensor amplifier 314, the heating controller 324, and the sensing circuit 328) may be disposed directly on one or more surfaces of the sensing system 300.

The sensors 114, 514, 614, 714 illustrate plural different embodiments of the sensor that may be disposed within the exterior housing 102 of the monolithic gas-sensing chip assembly 100. Optionally, the sensor may have any alternative configuration, shape, and/or size, may include any alternative measurement or data processing electronic device, or the like.

In one or more embodiments, the sensor 714 may include a communication and power transfer antenna. The communication and power transfer antenna may be formed on one of the electrical routing layers 322, one of the device layers 750, 752, or the like. In an alternative embodiment, the sensing element 352 formed by the sensing material 308 in contact with the electrodes 310, 312 may be formed as the communication and power transfer antenna. For example, the antenna structure may also be the sensing element 352. Alternatively, multiple different interconnect layers (or multiple locations on the same interconnect layer) may be utilized for the communication functions, power functions, and/or sensing functions of the sensor.

Figure 8:
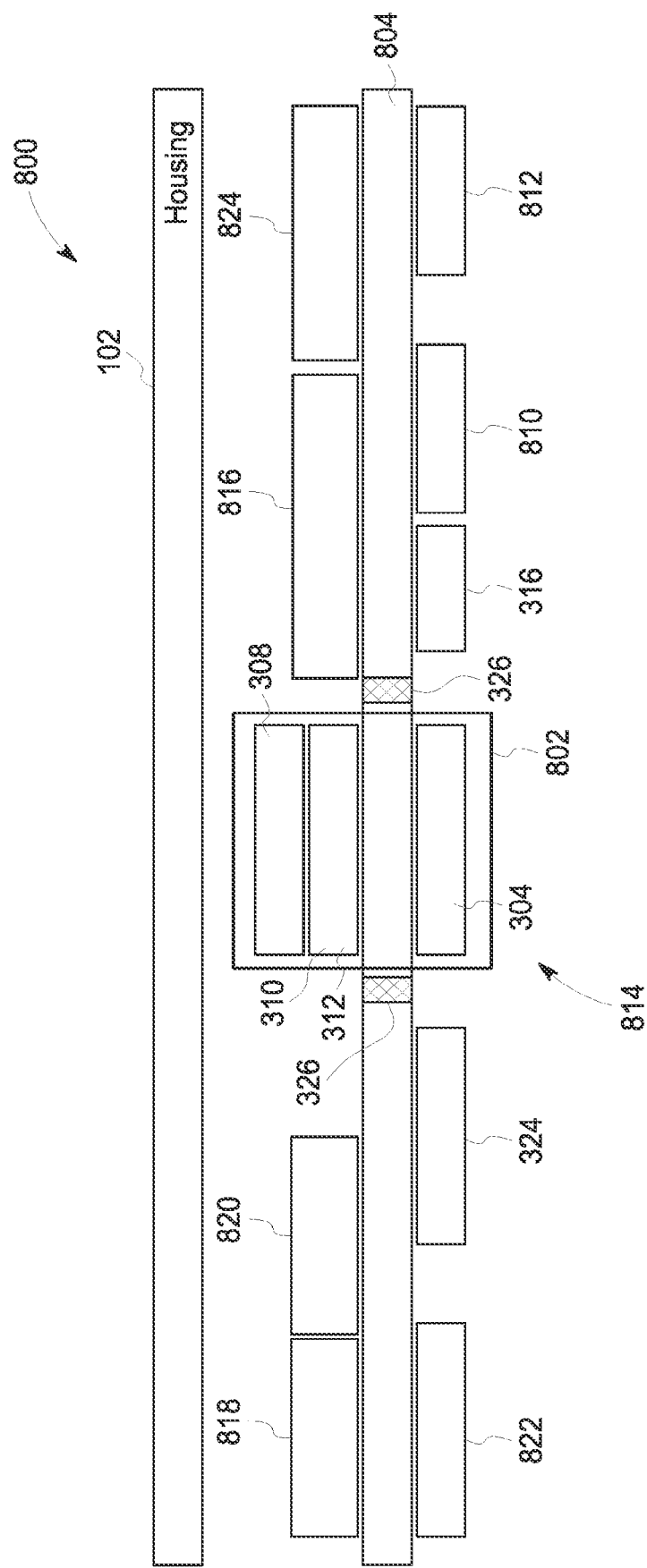
FIG. 8 illustrates one configuration of sensing circuitry of a sensor in accordance with one embodiment.

FIG. 8 illustrates one configuration of sensing circuitry 800 of a sensor 814 in accordance with one embodiment. The sensor 814 includes a sensing system 802 that includes the sensing material 308, the electrodes 310, 312, and the heating element 304 coupled with a substrate 804. Plural through-substrate vias 826 electrically interconnect the measurement and data processing electronics of the sensing circuitry 800 with the sensing system 802. The sensing circuitry 800 includes, but is not limited to, the memory 316 and heating controller 324, a power receiver 810, a power harvester 812, a processor for gas responses 816 at varying frequencies applied to the electrodes. a processor for temperature responses 824, an impedance detector 818 for a first frequency applied to the sensing electrodes, an impedance detector 820 for a different, second frequency applied to the sensing electrodes, and a multiplexer 822. The measurement and data processing electronics of the sensing circuitry 800 may be arranged in any configuration illustrated in FIGS. 4 through 7, or in any alternative configuration.

Figure 9:
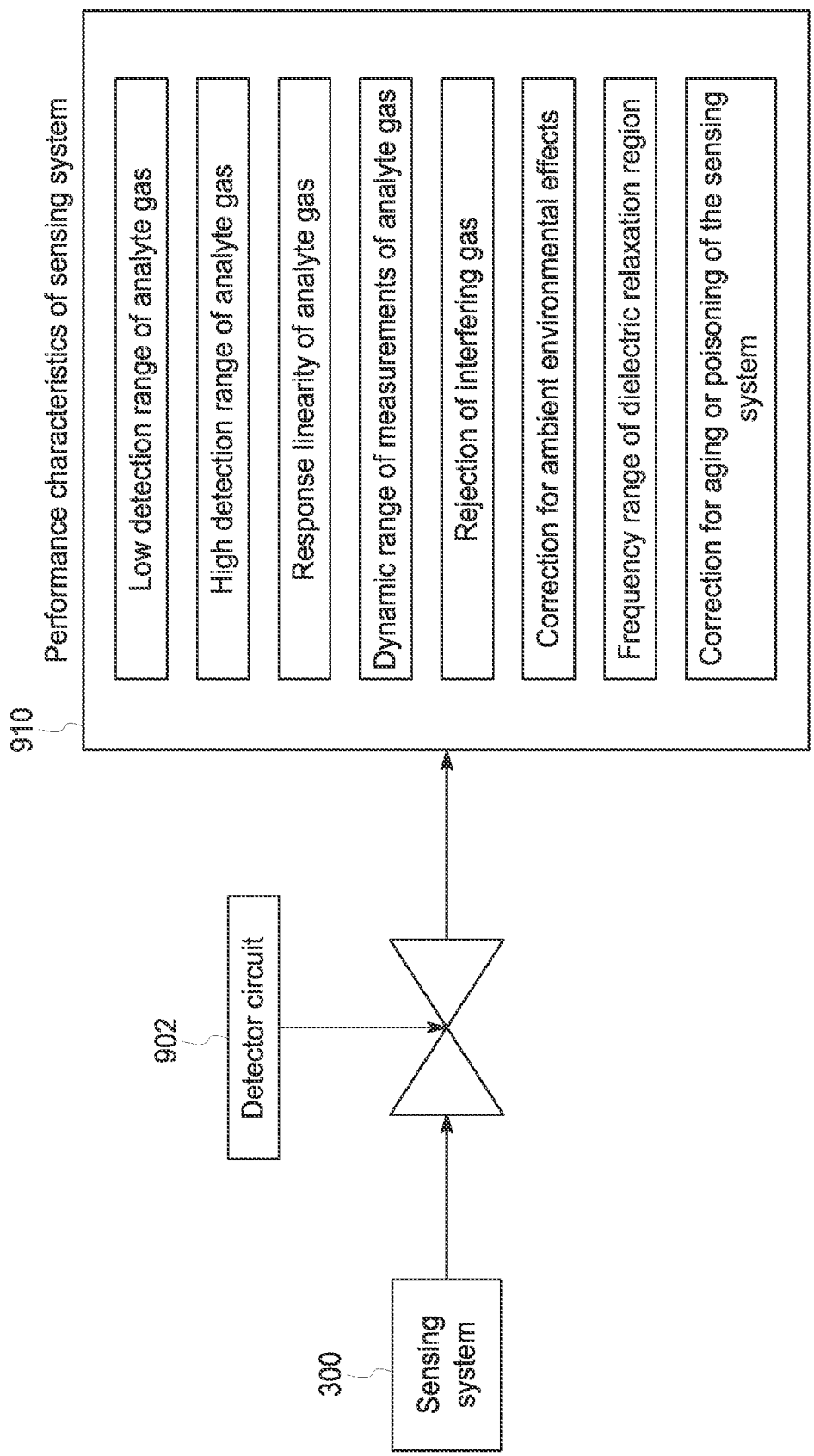
FIG. 9 illustrates non-limiting examples of characteristics of a sensor, in accordance with one embodiment.

FIG. 9 illustrates one example of the sensor 114 of the monolithic gas-sensing chip assembly 100 shown in FIG. 1 for detection and quantification of at least one analyte gas. The sensor may be represented by one of the sensors 114, 514, 614, or 714 illustrated in FIGS. 4 through 7. Optionally, the sensor may represent by an alternative multivariable sensor. The sensing system 300 includes a dielectric substrate having a sensing electrode structure. The sensing electrode structure of the sensing system 300 may be connected to data acquisition circuitry. The sensing electrode structure may be coated with a sensing material. The sensing electrode structure, with the sensing material, forms a sensing region circuit. The sensing electrode structure, with the sensing material that forms the sensing region circuit, may operationally contact a sample that contains analyte gases or contaminants.

The sensing system 300 is connected to a detector circuit 902. The detector circuit 902 may include one or more passive and/or active electrical components. Nonlimiting examples of passive electrical components include resistors, resistive elements, capacitors, capacitive elements, transformers, inductors, or the like. Nonlimiting examples of active electrical components are transistors, diodes, or the like. The detector circuit 902 is configured to detect and quantify at least one analyte gas by measuring the impedance of the sensing system 300 at one or more different frequencies during exposure of the sensing material to the analyte gas. The one or more frequencies may correspond to a frequency response range or a discrete frequency response characteristic of an impedance analyzer circuit, for example of the impedance system 332. The sensing material of the sensing system 300 may detect one or more gas analytes at am ambient temperature, at a temperature greater than or more elevated than the ambient temperature, at a temperature less than or lower than the ambient temperature, or the like.

The term impedance as used herein may be a non-limiting term for any electrical response of the sensing system to an alternating electrical current applied to the sensing system. Such response may be measured as different electrical properties. Nonlimiting examples of these commonly measured different electrical responses of the sensing system to alternating electrical current include impedance, admittance, reactance, susceptance, or the like. In the present specification, examples of the responses are given as impedances, however, other electrical responses of the sensing system to alternating electrical current may be also equally produced.

Measurements of the impedance of the sensing system 300 may be performed at a single frequency, at discrete frequencies, or at multiple scanned frequencies by an impedance analyzer circuit that may be a part of or coupled with the detector circuit 902 and conductively coupled with the sensing system 300. Optionally, the impedance analyzer circuit of the circuitry of the monolithic gas-sensing chip assembly may also or alternatively be called a spectrum analyzer, analyzer, alternating electrical current response analyzer, or the like.

Measurements of one or more of the real Z' or imaginary Z" parts of the impedance of the sensing system 300 may be performed within a dielectric relaxation region of the sensing system 300. The dielectric relaxation region of the sensing system 300 may be a range of frequencies within a designated threshold of the measured impedance of the sensing system 300 at the occurrence of relaxation peak and/or a relaxation point frequency or an inflection point frequency range of the imaginary Z" part of the impedance. For example, the relaxation peak (also known as relaxation frequency) may be identified as the location along the imaginary part of an impedance spectra at which the impedance response changes from being concave to convex, or changes from being convex to concave. The inflection point frequency is the frequency or the frequency range at which the inflection point occurs. Alternatively, the inflection point can be determined be examining the real part of the measured impedance of the sensing material 308 to locate where the curvature of the real part of the impedance changes from a concave shape to a convex shape, or from a convex shape to a concave shape.

The detector circuit 902 controls one or more of the performance characteristics 910 of the sensing system 300. This control may include control of low detection range of the sensing system to the analyte gas, a high detection range of the sensing system to the analyte gas, a response linearity of the sensing system to the analyte gas, a dynamic range of measurements of the analyte gas by the sensing system 300, a rejection of one or more interfering gases by the sensing system, a frequency range of the dielectric relaxation region of the sensing system 300, a correction for aging or poisoning of the sensing system 300, or a combination of two or more thereof.

Performance characteristics of the impedance system 332 include the frequency range of the impedance measurements measured by an impedance analyzer. Additionally or alternatively, other performance characteristics of the impedance system 332 include an amount of power required for operation, the size of the impedance analyzer circuit, the cost of the impedance system, or the like. The performance characteristics of the impedance system may be matched with the performance characteristics of the sensing system 300. For example, such matching may be the range of the impedance magnitude that is produced by the sensing system 300 that is measured by the impedance system 332. Additionally or alternatively, such matching may be the frequency range of the dielectric relaxation region that is produced by the sensing system and that needs to be measured by the impedance system.

Additionally or alternatively, the performance characteristics of the sensing system 300 may be matched with the performance characteristics of the impedance system 332. For example, such matching may be a frequency range of the dielectric relaxation region that is produced by the sensing system 300 and that can be measured by the impedance system. Additionally or alternatively, such matching may be the power required for operation of the sensor 114.

Figure 10:
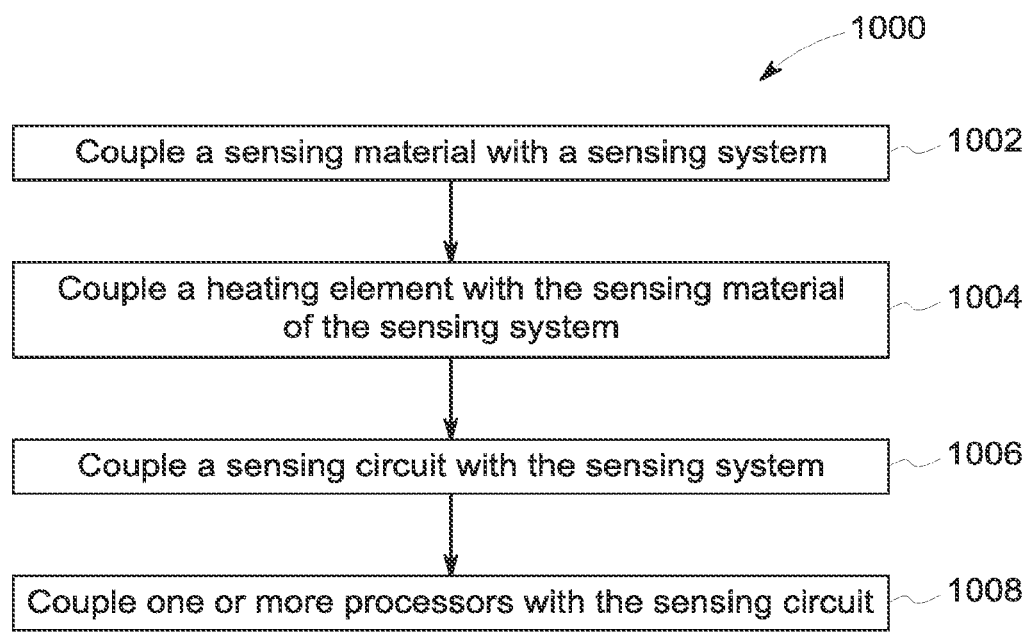
FIG. 10 illustrates a flow chart of one embodiment of a method for forming a monolithic gas-sensing chip assembly.

FIG. 10 illustrates a flow chart of one embodiment of a method 1000 for forming a monolithic gas-sensing chip assembly. The chip assembly may be represented by the monolithic gas-sensing chip assembly 100 illustrated in FIG. 1. The sensor may be represented by one of the sensors 114, 514, 614, or 714 illustrated in FIGS. 4 through 7. The sensor 114 is fabricated by coupling plural layers of varying substrates having at least a sensing system, a sensing material, a heating element, measurement and data processing electronics, dielectric insulative layers and electrical routing layers. All of the layers of the sensor are disposed within an exterior housing that has a largest exterior dimension that is no longer than four mm.

At 1002, a sensing material is coupled with a sensing system. The sensing material can detect at least one gas analyte. The sensing system can also include a resistor-capacitor electrical circuit in contact (e.g., direct or indirect contact) with the sensing material. For example, one or more through-substrate vias may conductively couple the sensing material with the RC electrical circuit.

At 1004, a heating element is coupled with the sensing material of the sensing system and is configured to apply heat to the sensing material. For example, the heating element controls a temperature of the sensing material of the sensing system. The heating element may be a resistive layer used as a heater for the sensor 114. The resistive layer may constitute an interconnect layer on the semiconductor process or may include additional metal deposited to perform the heating function. In one or more embodiments, the resistive layer may be made by metal that may be deposited utilizing sputtering, additive printing, chemical vapor deposition (CVD) techniques, or the like. Optionally, the resistive layer may be a polymeric layer, a nanocomposite layer, a polysilicon layer, or the like. The shape, size, and/or composition of the heating element is determined to provide target heating characteristics.

At 1006, a sensing circuit is coupled with the sensing system, and at 1008 one or more processors are coupled with the sensing system. In one embodiment, the sensing circuit may be one of one or more measurement and/or data processing electronics that may be disposed in a device layer of the sensor 114. The one or more processors may be represented by one or more measurement and data processing electronics disposed in the device layer of the sensor 114. The sensing electronics provide the ability to perform impedance measurements of the sensing system to determine responses by the sensing system to gases. Impedance measurements can be performed at least two different frequencies or at least two different RC configurations (e.g., different resistances, different capacitance) of the sensing system.

In the illustrated embodiment of the sensor 114 of FIG. 4, the heating element is disposed stacked between the sensing system and the measurement and data processing electronics, including the sensing circuit. Optionally, the sensor 114 may have an alternative configuration wherein the sensing system may be deposited directly on top of the measurement and data processing electronics.

The measurement and data processing electronics, including the sensing circuit and the one or more processors, may be built in conventional CMOS silicon electronics, or in any other semiconductor process. In one embodiment, a high temperature-compatible semiconductor (e.g., Silicon-on-Insulator, SiC, GaN, or the like) is used to allow for close integration of the electronics and the heating element.

In one embodiment, a low thermal conductivity dielectric may be used to reduce an amount of heat transfer from the heating element to the electronic devices. In one embodiment, the sensing circuit may be built in a high temperature electronics process, and the one or more processors of the data electronics may be built in a lower temperature process relative to the sensing circuit. The two dies may be stacked and connected through a through-substrate vias process. The measurement electronics, such as the sensing circuit, acts as a thermal barrier between the high temperature of the heating element and the lower temperature of the die comprising the one or more processors of the data electronics.

In one or more embodiments, a coil (not shown) may be fabricated on top of the application-specific integrated circuit gas sensor by patterning metal. For example, a coil may be deposited onto the sensor 114 using a very-large-scale integration (VLSI) lithography or another process. The VLSI lithography may allow for smaller, or a tighter geometry of the coil relative to another process, and also may enable closer integration with reduced noise electronics. Parasitics may also be reduced by suspending the coil by etching the dielectric layer underneath another layer of the sensor by using process steps commonly employed in microelectromechanical systems (MEMS) or high frequency monolithic microwave integrated circuits.

The monolithic gas-sensing chip assembly 100 includes the plural measurements and data processing electronics that may be used in one or more different ways to operate the sensor 114. In order to meet the one or more performance characteristics of the sensing system 300, different electronics may be used.

As one example, the sensor 114 may improve a linearity of electrical signals by changing an impedance of the sensing system. The sensing electrodes 310, 312 may apply a first electrical stimuli at a single electrical excitation frequency to the sensing material 308 of the sensing system 300 to detect and obtain one or more electrical signals. The sensing material 308 may be exposed to varying ranges of concentrations of hydrogen ($H_2$), methane ($CH_4$), ethane ($C_2H_6$), formaldehyde ($CH_2O$), benzene ($C_6H_6$), carbon monoxide (CO), or any alternative analyte gas or gases. The sensing circuit may receive one or more first electrical signals representative of resistance responses of the sensing material 308 via a resistance detector system 336. and may also receive one or more second electrical signals representative of an impedance response of the sensing system 300 via the impedance system 332 in addition to or in place of the electrical signals representative of the resistance responses of the sensing material 308.

The electrical signal may be changed by changing the electrical impedance of the sensing system 300. Changing the impedance of the sensing system 300 changes a linearity of the first electrical signal responses in relation to concentrations of a gas.

One or more processors may direct the modifier assembly 334 to change a configuration of the modifier assembly to change an impedance of the sensing system 300 based on the impedance response of the sensing material 308 and/or the resistance response of the sensing material 308. Controlling the modifier assembly 334 to change the impedance of the sensing system 300 dynamically changes the sensitivity of the sensing system 300. The sensing circuit may direct one or more circuits of the modifier assembly 334 to close (e.g., to electrically couple with the sensing system 300) and direct the other circuits to open (e.g., to electrically disconnect from the sensing system 300) at a time to change the impedance of the sensing system 300.

As another example, the sensor 114 may be used to sense environmental conditions and physiological parameters of a subject. The sensor 114 may include an environmental sensing element and a physiological sensing element that may be separate and unique to each other and contained within the exterior housing 102. Optionally, the sensor 114 may include the measurement and data processing electronics for both the environmental sensing element and the physiological sensing element.

The environmental sensor detects one or more environmental conditions of the environment in operational contact with a subject (e.g., human, animal, or the like) in response to applying a first electrical stimuli, and the physiological sensor detects one or more physiological parameters in response to applying a second electrical stimuli. The one or more processors determine a relation between the environmental conditions (indicated by the environmental signals) and the physiological parameters (indicated by the physiological signals) based on the environmental signal and the physiological signal.

As another example, the sensor 114 may operate with zero standby power, such that the system may turn on when a circuit changes from an open position to a closed position in the presence of an analyte of interest.

The sensor 114 may be in a normal open position (e.g., in an initial zero-power, standby-mode, off-mode, or the like) such that the sensing circuit 328 is open and no electric current is conducted through the sensing circuit 328. Responsive to a sensing region detecting an analyte of interest, one or more gaps of a sensing region of the sensing system 300 may close. Closing the one or more gaps changes the state of the sensor 114 from the normal open position (e.g., initial zero-power, standby-mode, off-mode, of the like) to a closed position (e.g., on-mode, active-mode, or the like) such that the sensing circuit 328 is closed and electric current can be conducted through the sensing circuit 328. The sensor 114 in the closed position consumes an increased amount of power relative to the sensor 114 in the open position.

As another example, the one or more processors may correct response drift of the sensor 114 without powering off the sensor 114 and without requiring a calibration gas to calibrate the sensor 114. Optionally, the one or more processors may correct drift of the sensor 114 with powering off the sensor and without requiring a calibration gas to calibrate the sensor 114.

The sensing circuit 328 receives a first sensor output at conditions that provide response to the gas of interest or gases of interest. The sensor output may be a quantitative gas response, such as a sensor impedance response that may include a response drift. The one or more processors direct the electrodes 310, 312 to apply a second electrical stimuli at a second electrical excitation frequency to the sensing material 308. The sensing circuit 328 receives a second sensor output at conditions that are not affected by the gas of interest or gases of interest. The sensor output may be a baseline response that is based, at least in part, on the response drift of the quantitative gas response.

The one or more processors can change from operating in the gas response mode to the baseline correction mode and apply a baseline correction to the first and second sensor outputs to determine a difference between the response drift and the second sensor response (e.g., the baseline response). The one or more processors can also control one or more circuits of the sensor 114 to change the impedance of the electrical stimuli applied to the sensing material 308. For example, the one or more processors may control one or more of the plural circuits to apply the baseline correction to the first and second sensor responses without changing the electrical excitation frequency of the electrical stimuli applied to the sensing electrodes.

As another example, the one or more processors may control a sensor response selectivity, sensitivity, and linearity at different sensitivity ranges of the analyte gas upon exposure to different gases. The sensing material may be in contact with a sample having one or more analyte gases therein, such as transformer oil having dissolved gases in the oil at different concentrations. The dissolved gases may be one or more of $CO$, $CO_2$, $H_2$, $CH_4$, $C_2H_2$, $C_2H_4$, or $C_2H_6$. Other nonlimiting examples of classes and types of measured gases and volatiles of interest include environmental background (e.g., $O_2$, $CO_2$, $H_2O$), transportation, industrial, or agricultural atmospheric pollutants (e.g., $CO_2$, $CO$, $O_3$, $H_2S$, $NH_3$, $NO_x$, $SO_2$, $CH_4$, industrial fumes, waste odors, or the like), breath biomarkers (e.g., $NO$, $H_2S$, $NH_4$, acetone, ethane, pentane, isoprene, hydrogen peroxide), and public safety and/or homeland safety hazardous volatiles (e.g., toxic industrial chemicals, chemical warfare agents, explosives, or the like).

A concentration of the analyte gas of interest is determined based on the electrical signal received from the sensor and on the previously developed and stored transfer function between the multivariable response of the sensor and analyte concentrations. For example, the sensor transfer function can include a relationship between the sensor response signal and the analyte gas concentration used to determine the analyte gas concentration in different applications of the sensor. The electrical signal is representative of an impedance of the sensing material during exposure of the sensing material to the sample at the one or more different frequencies, wherein the impedance of the sensing material indicates a concentration of the analyte gas of interest. For example, the electrical signal may be a first impedance response, wherein the first impedance response may indicate a first concentration of H2 present in the sample.

The one or more processors may determine whether the determined concentration of the analyte gas of interest differs from one or more designated thresholds. For example, the analyte gas of interest may be H2. If the determined concentration of H2 in the sample of transformer oil is less than or greater than a designated threshold concentration or amount of H2, the too low or too high concentration of H2 may indicate previous and/or potential faults with the transformer.

As another example, the one or more processors may control a sensor response selectivity and linearity to allow the sensor to be more responsive to one analyte versus another analyte at different times or under different operating conditions. The one or more processors can determine a relaxation region of the sensor impedance. Both the real part of the impedance and the imaginary part of the impedance have a relaxation region. As one example, this relaxation region can be determined by examining the real part of the measured impedance of the sensing material 308 as a function of frequency to locate where the real part of the impedance changes from high impedance value and zero slope at low frequencies, to decreasing impedance values with a relatively high slope at higher frequencies, and to decreasing impedance values with a relatively low slope at even higher frequencies, and where impedance values are approaching zero at the highest frequencies.

The one or more processors determine a position of the relaxation peak of the relaxation region of the imaginary part of the sensor impedance by identifying the inflection point frequency of the sensor 114. The inflection point frequency can be determined as the frequency of the electric current associated with the inflection point.

The one or more processors determine frequency ranges of sensor operation that are lower and higher than the relaxation peak of the imaginary part of the sensor impedance and that are at or about (e.g., within 1%, within 3%, within 5%, or within 10% in different embodiments) the relaxation peak of the imaginary part of the sensor impedance. An electric current may be applied to the sensing material 308 via the electrodes 310, 312 only at frequencies that are greater than the inflection point frequency and/or that are within the range of frequencies that are greater than the inflection point frequency. Operating the sensor 114 at these frequencies can improve the selective sensing of the sensor 114 (e.g., the sensitivity of the sensor 114) to one or more analytes of interest in the second sample relative to one or more other analytes (and relative to operating the sensor 114 at a frequency or frequencies that are at or below the inflection point frequency). The sensitivity of the sensor 114 includes a measured sensor response signal per analyte concentration unit.

Optionally, impedance sensing may be performed with improved sensitivity at low concentrations of analytes as compared to traditional resistance measurements. This sensing can be performed at a frequency range of sensor operation that is lower than the relaxation peak of the imaginary part of the sensor impedance. Optionally, impedance sensing is performed with improved linearity and suppressed effects of interferences at a frequency range of sensor operation that is higher than the relaxation peak of the imaginary part of the sensor impedance as compared to traditional resistance measurements. Optionally, impedance sensing is performed with improved quantitation of at least two analytes with a single sensor as compared to traditional resistance measurements. The sensing can be performed at a frequency range that is at or around the relaxation peak of the imaginary part of the sensor impedance and lower and higher than the relaxation peak of the imaginary part of the sensor impedance.

As another example, the one or more processors may selectivity sense at least one analyte of interest with improved suppressed effects of interferences. Resistance and capacitance properties of the sensing system 300 are measured during exposure of the sensing system 300 to a first gas sample and are measured during exposure of the sensing system 300 to a second gas sample. The one or more processors determine a capacitance value or a range of capacitance values of one or more passive electrical components (e.g., capacitive elements) in order to change a capacitance of the sensing system 300 to match a frequency range or a discrete frequency response of the impedance system 332 within a dielectric relaxation region of the sensing system 300. Changing the capacitance of the sensing system 300, that is coupled with the impedance system 332, allows the impedance system 332 to selectively sense an analyte of interest (e.g., methane, ethane, another hydrocarbon, hydrogen, carbon monoxide, or the like) with suppressed effects of interferences.

The one or more processors change the capacitance of the sensing system 300 by selectively coupling one or more of the passive electrical components of the sensor 114 to a sensing region circuit of the sensing system 300. For example, the data acquisition circuitry 318 can communicate a control signal to the sensing system 300 to direct one or more switches of one or more of the passive electrical components to open or close in order to change the capacitance of the sensing system 300.

Selective sensing of one or more analytes of interest is performed using the sensing system 300 operating within a dielectric relaxation region of the sensing system in order to match a discrete frequency response or a frequency response range of the impedance system 332. For example, the sensing material 308 of the sensing system 300 can be exposed to a gas sample potentially having one or more analytes of interest therein. The data acquisition circuitry 318 can communicate a control signal to the sensing system 300 to direct the sensing system 300 to apply electric current to the sensing material 308 via the electrodes 310, 312 either over a designated frequency response range or at the designated discrete frequency of the impedance system 332 that is within the dielectric relaxation region of the sensing system 300. Operating the sensing system 300 at these frequencies can increase the selective sensing of the sensing system 300 (e.g., the sensitivity of sensing of the sensing system 300) to one or more analytes of interest in the sample relative to one or more other analytes (and relative to operating the sensing system 300 at a different frequency or different frequency range of the impedance system 332). The sensitivity of the sensor 114 includes a measured sensor response signal per analyte concentration unit.

As another example, the chip assembly 100 may be used to monitor and assess a lubricating oil or any other industrial fluid, for example to determine engine health. The assembly 100 may be used to independently monitor a concentration of water in oil, a concentration of acid in oil (e.g., total acid number of oil), and/or a concentration of base in oil (e.g., total base number of oil), to determine a concentration of water in oil, a concentration of fuel in oil, and a temperature of the oil.

The monolithic gas-sensing chip assembly 100 may be immersed in oil that may be used for lubricating a machine having moving parts, such as an engine. The assembly 100 is immersed into the oil such that a sensing region of the sensor is in operational contact with the oil via one of the openings 106 of the exterior housing 102. The opening may include a gas-permeable membrane. Electrical response parameters are measured responsive to the application of an electrical stimulus to the sensing region. The electrical response parameters are measured by the one or more processors receiving an electrical signal from the sensor that is representative of a resonant or non-resonant impedance response or spectra of the sensing region of the sensor in operational contact with the oil. The resonant impedance response shows the response of the sensing region in contact with the oil over the frequency range that includes the multiple resonant frequencies of the LCR resonant circuits. The one or more processors are configured to analyze the resonance parameters to quantitatively determine (e.g., estimate) the concentrations of water, acid, and/or base in the oil. The one or more processors optionally may also be configured to estimate a health of the oil and/or the machine in which the oil is used based on the concentrations of water and acid in the oil. Furthermore, the one or more processors may be configured to predict a remaining life of the oil and/or the machine based on the concentrations of water and acid in the oil.

As another example, the one or more processors may analyze frequencies from the imaginary portion of the impedance response to provide an improved linear response over non-linear resistance responses in conventional environmental sensors. The frequency at the shoulder of the dielectric relaxation spectrum of the sensing system may be chosen to improve the linearity of the electrical signal.

As another example, the one sensor may include a wireless sensor network having sensor nodes that may detect different analytes of interest. The sensor response may have improved sensitivity responsive to the sensor is operating as a resonant circuit relative to the sensor operating as a non-resonant circuit.

As another example, the sensor may be operated at a substantially constant temperature, or at a temperature that is less than a nominal temperature that may be required for discrimination between gases. For example, an amount or concentration of one or more hydrocarbons of interest may be measured by the one or more processors. The hydrocarbon or hydrocarbons of interest include hydrocarbons having lower weight (e.g., molecular weight) than one or more other hydrocarbons in one embodiment. The amount and/or concentration of the hydrocarbon(s) of interest are measured by one or more embodiments of the sensing systems or sensors described herein at operational condition(s) that are different than known, prescribed conditions. For example, the sensor can operate at a reduced heater voltage of four volts (instead of five volts or greater) and/or can heat the sensing film exposed to the sample being examined (e.g., the natural gas) to a lower temperature of less than 300 degrees Celsius. The amount and/or concentration of the hydrocarbon(s) of interest are determined from one or more impedance spectra, as described above.

As another example, the one or more processors may generate responses of the sensing system to provide correction for aging or poisoning of the sensing system. Aging or poisoning is defined here as any detectable change in sensor sensitivity, sensor selectivity, sensor offset, sensor drift, sensor response time, or sensor recovery time upon normal operation conditions of the sensor over time or upon exposure of the sensor to any undesired conditions. Nonlimiting examples of the undesired conditions may include poisoning, mechanical degradation, and any other undesired conditions. The one or more processors may use the condition of the sensor when the sensor is not responding to a gas or fluid of interest, but is quantitatively affected by aging of the sensor. For example, responsive to a sensor probe assembly being in the OFF state (i.e., not powered), this sensor condition or sensor state is quantitatively affected by the aging of the sensor probe assembly and can be detected by resistance and/or impedance spectroscopy readouts of the assembly at a specific range of frequencies. Responsive to the same sensor probe assembly being in the ON state (i.e., powered), the drift in the sensor response due to aging is correlated with the OFF state of the sensor probe assembly. The response of the sensor probe assembly when in the OFF state (also referred to as the OFF sensor response) can be used to correct for drift in the response of the sensor probe assembly in the ON state (also referred to as the ON sensor response) due to aging. When the sensor is in OFF state (not powered), the sensor output is measured and then utilized to correct for aging effects when the sensor is in the ON state. This aging condition of the sensor can be detected by resistance and/or impedance spectroscopy readouts at a specific range of frequencies.

In one or more embodiments of the subject matter described herein, a monolithic gas-sensing chip assembly for sensing at least one gas analyte includes a sensing material configured to detect the at least one gas analyte, a sensing system that includes a resistor-capacitor electrical circuit in contact with the sensing material, and a heating element configured to control a temperature of the sensing material of the sensing system. A sensing circuit is configured to measure an electrical response of the sensing system to an alternating electrical current applied to the sensing system at one or more of: (a) one or more different frequencies, or (b) one or more different resistor-capacitor configurations of the sensing system. One or more processors may control one or more of a low detection range of the sensing system to the at least one gas analyte, a high detection range of the sensing system to the at least one gas analyte, a linearity of a response of the sensing system to the at least one gas analyte, a dynamic range of measurements of the at least one gas analyte by the sensing system, a rejection of one or more interfering gas analytes by the sensing system, a correction for aging or poisoning of the sensing system, or a rejection of ambient interferences that may affect the electrical response of the sensing system to the alternating electrical current applied to the sensing system that may be measured by the sensing circuit.

Optionally, the monolithic gas-sensing chip assembly also includes an exterior housing in which all of the sensing material, the sensing system, the heating element, the sensing circuit, and the one or more processors are disposed.

Optionally, the exterior housing has a largest exterior dimension that is not longer than four millimeters.

Optionally, the sensing circuit is disposed in a high temperature-compatible substrate.

Optionally, the high temperature-compatible substrate is a semiconductor substrate.

Optionally, the semiconductor substrate thermally isolates the one or more processors from the sensing circuit.

Optionally, the one or more processors are configured to be disposed in a semiconductor substrate that is thermally isolated from the sensing circuit.

Optionally, the semiconductor substrate that is thermally isolated from the sensing circuit is configured to be operated at a temperature that is lower than the temperature of the sensing material.

Optionally, the sensing circuit and the one or more processors are stacked on top of each other and galvanically coupled with each other by one or more through-substrate vias.

Optionally, the monolithic gas-sensing chip assembly also includes a dielectric insulative layer disposed between (a) the heating element and (b) the sensing circuit and the one or more processors.

Optionally, the sensing circuit and the one or more processors are thermally isolated from the heating element.

Optionally, the sensing system is disposed proximate to the sensing circuit.

Optionally, the heating element is a resistive layer between the sensing system and the sensing circuitry that also operates as an interconnect between the sensing system and the sensing circuitry.

Optionally, the resistive layer is configured to be one or more of a metal layer, a polymeric layer, a nanocomposite layer, or a polysilicon layer.

Optionally, the sensing system includes a communication and power transfer antenna.

Optionally, the sensing system comprises a sensing element, wherein the sensing element is formed as the communication and power transfer antenna.

Optionally, the sensing system and the power transfer antenna are formed in different layers of a common substrate.

Optionally, the assembly is configured to produce one or more electrical responses of the sensing system to a combination of the alternating electrical current and a direct electrical current applied to the sensing system.

Optionally, the one or more processors are configured to wirelessly communicate one or more outputs of the sensing system.

In one or more embodiments of the subject matter described herein, a method for forming a monolithic gas-sensing chip assembly for sensing at least one gas analyte includes coupling a sensing material with a sensing system. The sensing material may detect the at least one gas analyte. The sensing system includes a resistor-capacitor electrical circuit in contact with the sensing material. A heating element is coupled with the sensing material to control a temperature of the sensing material. A sensing circuit is coupled with the sensing material. The sensing circuit is configured to measure one or more electrical responses of the sensing system to an alternating electrical current applied to the sensing system at one or more of: one or more different frequencies, or one or more different resistor-capacitor configurations of the sensing system. One or more processors are coupled with the sensing circuit. The one or more processors are configured to control one or more of a low detection range of the sensing system to the at least one gas analyte, a high detection range of the sensing system to the at least one gas analyte, a linearity of a response of the sensing system to the at least one gas analyte, a dynamic range of measurements of the at least one gas analyte by the sensing system, a rejection of one or more interfering gas analytes by the sensing system, a correction for aging or poisoning of the sensing system, or a rejection of ambient interferences to the impedances that are measured by the sensing circuit.

Optionally, the method also includes placing all of the sensing material, the sensing system, the heating element, the sensing circuit, and the one or more processors within an exterior housing.

Optionally, the method also includes disposing the sensing circuit in a high temperature-compatible substrate.

Optionally, the method also includes placing a dielectric insulative layer between (a) the heating element and (b) the sensing circuit and the one or more processors.

In one or more embodiments of the subject matter described herein, a gas sensing assembly includes a sensing material configured to detect a gas, and a sensing system that includes a resistor-capacitor electrical circuit in contact with the sensing material. The resistor-capacitor electrical circuit is configured to change one or more of a resistance or a capacitance of the resistor-capacitor electrical circuit. A heating element is configured to control a temperature of the sensing material of the sensing system, and a sensing circuit is configured to measure one or more electrical responses to an alternating electrical current that is configured to be applied to the sensing system at one or more of different frequencies, different resistances of the resistor-capacitor electrical circuit, or different capacitances of the resistor-capacitor electrical circuit. The gas sensing assembly includes an exterior housing in which the sensing material, the sensing system, the heating element, and the sensing circuit are disposed in a stacked arrangement.

Optionally, the gas sensing assembly also includes one or more processors configured to control one or more of a low detection range of the sensing system to the gas, a high detection range of the sensing system to the gas, a linearity of a response of the sensing system to the gas, a dynamic range of measurements of the gas by the sensing system, a rejection of one or more interfering gas analytes by the sensing system, a correction for aging or poisoning of the sensing system, or a rejection of ambient interferences that may affect the electrical response of the sensing system to the alternating electrical current applied to the sensing system that may be measured by the sensing circuit.

Optionally, the one or more processors are configured to be one or more of a signal-processor or a control element.

Optionally, the sensing circuit is disposed in a high temperature-compatible semiconductor substrate. The one or more processors are disposed in a lower temperature semiconductor substrate than the sensing circuit. The sensing circuit and the one or more processors are conductively coupled with each other by one or more through-substrate vias.

As used herein, an element or step recited in the singular and proceeded with the word "a" or "an" should be understood as not excluding plural of said elements or steps, unless such exclusion is explicitly stated. Furthermore, references to "one embodiment" of the presently described inventive subject matter are not intended to be interpreted as excluding the existence of additional embodiments that also incorporate the recited features. Moreover, unless explicitly stated to the contrary, embodiments "comprising," "including," or "having" (or like terms) an element, which has a particular property or a plurality of elements with a particular property, may include additional such elements that do not have the particular property.

As used herein, terms such as "system" or "controller" may include hardware and/or software that operate(s) to perform one or more functions. For example, a system or controller may include a computer processor or other logic-based device that performs operations based on instructions stored on a tangible and non-transitory computer readable storage medium, such as a computer memory. Alternatively, a system or controller may include a hard-wired device that performs operations based on hard-wired logic of the device. The systems and controllers shown in the figures may represent the hardware that operates based on software or hardwired instructions, the software that directs hardware to perform the operations, or a combination thereof.

As used herein, terms such as "operably connected," "operatively connected," "operably coupled," "operatively coupled," "operationally contacted," "operational contact" and the like indicate that two or more components are connected in a manner that enables or allows at least one of the components to carry out a designated function. For example, when two or more components are operably connected, one or more connections (electrical and/or wireless connections) may exist that allow the components to communicate with each other, that allow one component to control another component, that allow each component to control the other component, and/or that enable at least one of the components to operate in a designated manner.

It is to be understood that the subject matter described herein is not limited in its application to the details of construction and the arrangement of elements set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the presently described subject matter without departing from its scope. While the dimensions, types of materials and coatings described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A gas-sensing chip assembly for sensing at least one gas analyte, the chip assembly comprising:
    a sensing material configured to detect the at least one gas analyte;
    a sensing system that includes an electrical circuit in contact with the sensing material;
    a heating element configured to control a temperature of the sensing material of the sensing system;
    a sensing circuit configured to measure an electrical response of the sensing system to an alternating electrical current applied to the sensing system;
    one or more processors configured to control one or more of: a low detection range of the sensing system to the at least one gas analyte, a high detection range of the sensing system to the at least one gas analyte, a linearity of a response of the sensing system to the at least one gas analyte, a dynamic range of measurements of the at least one gas analyte by the sensing system, a rejection of one or more interfering gas analytes by the sensing system, a correction for aging or poisoning of the sensing system, or a rejection of ambient interferences that may affect the electrical response of the sensing system to the alternating electrical current applied to the sensing system that may be measured by the sensing circuit; and
    a monolithic exterior housing in which the sensing material, the sensing system, the heating element, the sensing circuit, and the one or more processors are disposed.

2. The gas-sensing chip assembly of claim 1, wherein the heating element is configured to control the temperature of the sensing material to be substantially constant.

3. The gas-sensing chip assembly of claim 1, wherein the heating element is configured to control the temperature of the sensing material based on a temperature profile.

4. The gas-sensing chip assembly of claim 1, comprising an exterior housing in which the sensing material, the sensing system, the heating element, the sensing circuit, the one or more processors, or a combination thereof, are disposed.

5. The gas-sensing chip assembly of claim 1, wherein the sensing circuit is disposed in a high temperature-compatible substrate.

6. The gas-sensing chip assembly of claim 5, wherein the high temperature-compatible substrate thermally isolates the one or more processors from the sensing circuit.

7. The gas-sensing chip assembly of claim 1, comprising a dielectric insulative layer disposed between (a) the heating element and (b) the sensing circuit and the one or more processors.

8. The gas-sensing chip assembly of claim 1, wherein the heating element comprises a resistive layer between the sensing system and the sensing circuit.

9. The gas-sensing chip assembly of claim 1, wherein the one or more processors are configured to wirelessly communicate one or more outputs of the sensing system.

10. A method for forming a gas-sensing chip assembly for sensing at least one gas analyte, the method comprising:
    coupling, within a monolithic exterior housing, a sensing material with a sensing system, the sensing material configured to detect the at least one gas analyte, the sensing system including an electrical circuit in contact with the sensing material;
    coupling, within the monolithic exterior housing, a heating element with the sensing material, the heating element configured to control a temperature of the sensing material;
    coupling, within the monolithic exterior housing, a sensing circuit with the sensing material, the sensing circuit configured to measure one or more electrical responses of the sensing system to an alternating electrical current applied to the sensing system circuit; and
    coupling, within the monolithic exterior housing, one or more processors with the sensing circuit, the one or more processors configured to control one or more of: a low detection range of the sensing system to the at least one gas analyte, a high detection range of the sensing system to the at least one gas analyte, a linearity of a response of the sensing system to the at least one gas analyte, a dynamic range of measurements of the at least one gas analyte by the sensing system, a rejection of one or more interfering gas analytes by the sensing system, a correction for aging or poisoning of the sensing system, or a rejection of ambient interferences to the one or more electrical responses that are measured by the sensing circuit.

11. The method of claim 10, wherein the heating element is configured to control the temperature of the sensing material to be substantially constant.

12. The method of claim 10, wherein the heating element is configured to control the temperature of the sensing material based on a temperature profile.

13. The method of claim 10, wherein the sensing circuit is disposed m a high temperature-compatible substrate.

14. The method of claim 10, wherein a dielectric insulative layer is disposed between (a) the heating element and (b) the sensing circuit and the one or more processors.

15. A gas sensing assembly comprising:
    a sensing material configured to detect a gas;
    a sensing system that includes an electrical circuit in contact with the sensing material;
    a heating element configured to control a temperature of the sensing material of the sensing system;
    a sensing circuit configured to measure one or more electrical responses to an alternating electrical current that is configured to be applied to the sensing system; and
    a monolithic exterior housing in which the sensing material, the sensing system, the heating element, and the sensing circuit are disposed.

16. The gas sensing assembly of claim 15, wherein the heating element is configured to control the temperature of the sensing material to be substantially constant.

17. The gas sensing assembly of claim 15, wherein the heating element is configured to control the temperature of the sensing material based on a temperature profile.

18. The gas sensing assembly of claim 15, comprising one or more processors configured to control one or more of: a low detection range of the sensing system to the gas, a high detection range of the sensing system to the gas, a linearity of a response of the sensing system to the gas, a dynamic range of measurements of the gas by the sensing system, a rejection of one or more interfering gas analytes by the sensing system, a correction for aging or poisoning of the sensing system, or a rejection of ambient interferences that may affect the electrical response of the sensing system to the alternating electrical current applied to the sensing system that may be measured by the sensing circuit.

19. The gas sensing assembly of claim 18, wherein the sensing circuit is disposed in a high temperature-compatible semiconductor substrate and the one or more processors are disposed in a lower temperature semiconductor substrate than the sensing circuit.

20. The gas sensing assembly of claim 19, wherein the sensing circuit and the one or more processors are conductively coupled via one or more through-substrate vias.

\* \* \* \* \*